United States Patent
Si

(10) Patent No.: US 12,501,446 B2
(45) Date of Patent: Dec. 16, 2025

(54) METHOD AND APPARATUS OF ENHANCEMENT TO STANDALONE OPERATION

(71) Applicant: Samsung Electronics Co., Ltd., Suwon-si (KR)

(72) Inventor: Hongbo Si, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 83 days.

(21) Appl. No.: 18/508,014

(22) Filed: Nov. 13, 2023

(65) Prior Publication Data

US 2024/0121791 A1    Apr. 11, 2024

Related U.S. Application Data

(63) Continuation of application No. 17/643,387, filed on Dec. 8, 2021, now Pat. No. 11,849,311.
(Continued)

(51) Int. Cl.
*H04W 72/23* (2023.01)
*H04L 5/00* (2006.01)

(52) U.S. Cl.
CPC ........... *H04W 72/23* (2023.01); *H04L 5/0048* (2013.01)

(58) Field of Classification Search
CPC .............................. H04W 72/23; H04L 5/0048
See application file for complete search history.

(56) References Cited

U.S. PATENT DOCUMENTS

| 2019/0159180 A1 | 5/2019 | Ly et al. |
| 2020/0221428 A1 | 7/2020 | Moon |
| 2020/0344097 A1* | 10/2020 | Si .................... H04W 72/0453 |

FOREIGN PATENT DOCUMENTS

| CN | 110505642 A | 11/2019 |
| EP | 4017070 A1 | 6/2022 |
| WO | 2020130573 A1 | 6/2020 |

OTHER PUBLICATIONS

"3rd Generation Partnership Project; Technical Specification Group Radio Access Network; NR; Physical layer procedures for control (Release 16)", 3GPP TS 38.213 V16.3.0 (Sep. 2020), 180 pages.
Moderator (Samsung), "Summary for [103-e-NR-7.1CRs-07] 38.211 Draft CR (Rel-16,F) on k_SSB calculation", 3GPP TSG RAN WG1 #103-e, Oct. 26-Nov. 13, 2020, R1-2009484, 10 pages.
(Continued)

*Primary Examiner* — Ronald B Abelson

(57) ABSTRACT

Apparatuses and methods for enhancement to standalone operation for higher frequency range in a wireless communication system. A method includes receiving a synchronization signals and physical broadcast channel (SS/PBCH) block and determining a set of configurations for a control resource set (CORESET #0) to receive a Type0 physical downlink control channel (Type0-PDCCH). The set of configurations includes a multiplexing pattern between the CORESET #0 and the SS/PBCH block; a number $NR_{RB}^{CORESET\,\#0}$ of resource blocks (RBs) for the CORESET #0; a number $N_{symbol}^{CORESET\,\#0}$ of symbols for the CORESET #0; and a frequency offset between the CORESET #0 and the SS/PBCH block. For a first multiplexing pattern between the CORESET #0 and the SS/PBCH block, the frequency offset between the CORESET #0 and the SS/PBCH block is determined as one of 0, $N_{RB}^{CORESET\,\#0} - N_{RB}^{SSB}$, or $(N_{RB}^{CORESET\,\#0} - N_{RB}^{SSB})/2$. The method further includes receiving the Type0-PDCCH based on the set of configurations for the CORESET #0 over a downlink channel.

12 Claims, 7 Drawing Sheets

Related U.S. Application Data

(60) Provisional application No. 63/274,787, filed on Nov. 2, 2021, provisional application No. 63/151,285, filed on Feb. 19, 2021, provisional application No. 63/133,634, filed on Jan. 4, 2021, provisional application No. 63/126,268, filed on Dec. 16, 2020.

(56) References Cited

OTHER PUBLICATIONS

Moderator (intel Corporation), "[103-e-NR-52-71-Waveform-Changes] Discussions Summary #5", 3GPP TSG RAN WG1 Meeting #103-e, Oct. 26-Nov. 13, 2020, R1-2009717, 197 pages.
"3rd Generation Partnership Project; Technical Specification Group Radio Access Network; NR; Physical channels and modulation (Release 16)", 3GPP TS 38.211 V16.3.0 (Sep. 2020), 134 pages.
International Search Report dated Mar. 24, 2022 in connection with International Patent Application No. PCT/KR2021/019080, 3 pages.
Written Opinion of the International Searching Authority dated Mar. 24, 2022 in connection with International Patent Application No. PCT/KR2021/019080, 3 pages.
"3rd Generation Partnership Project; Technical Specification Group Radio Access Network; NR; Physical channels and modulation (Release 16)", 3GPP TS 38.211 V16.1.0, Mar. 2020, 130 pages.
"3rd Generation Partnership Project; Technical Specification Group Radio Access Network; NR; Multiplexing and channel coding (Release 16)", 3GPP TS 38.212 V16.1.0, Mar. 2020, 146 pages.
"3rd Generation Partnership Project; Technical Specification Group Radio Access Network; NR; Physical layer procedures for control (Release 16)" 3GPP TS 38.213 V16.1.0, Mar. 2020, 156 pages.
"3rd Generation Partnership Project; Technical Specification Group Radio Access Network; NR; Physical layer procedures for data (Release 16)", 3GPP TS 38.214 V16.1.0, Mar. 2020, 151 pages.
"5G; NR; Radio Resource Control (RRC); Protocol specification (3GPP TS 38.331 version 16.1.0 Release 16)", ETSI TS 138 331 V16.1.0, Jul. 2020, 886 pages.
Extended European Search Report issued Apr. 4, 2024 regarding Application No. 21907094.3, 8 pages.

* cited by examiner

METHOD AND APPARATUS OF ENHANCEMENT TO STANDALONE OPERATION

CROSS-REFERENCE TO RELATED APPLICATIONS AND CLAIM OF PRIORITY

This application is a continuation of U.S. patent application Ser. No. 17/643,387 filed on Dec. 8, 2021, which claims priority to: U.S. Provisional Patent Application No. 63/126,268, filed on Dec. 16, 2020; U.S. Provisional Patent Application No. 63/133,634, filed on Jan. 4, 2021; U.S. Provisional Patent Application No. 63/151,285, filed on Feb. 19, 2021; and U.S. Provisional Patent Application No. 63/274,787, filed on Nov. 2, 2021. The content of the above-identified patent document is incorporated herein by reference.

TECHNICAL FIELD

The present disclosure relates generally to wireless communication systems and, more specifically, the present disclosure relates to enhancement to standalone operation for higher frequency range in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to enhancement to standalone operation for higher frequency range in a wireless communication system.

In one embodiment, a base station (BS) in a wireless communication system is provided. The BS includes a processor configured to determine a set of configurations for a control resource set (CORESET #0) for a Type0 physical downlink control channel (Type0-PDCCH). The set of configurations includes a subcarrier spacing (SCS) for the CORESET #0, that is the same as a subcarrier spacing of a synchronization signals and physical broadcast channel (SS/PBCH) block; a multiplexing pattern between the CORESET #0 and the SS/PBCH block; a number $N_{RB}^{CORESET\ \#0}$ of resource blocks (RBs) for the CORESET #0; a number $N_{symbol}^{CORESET\ \#0}$ of symbols for the CORESET #0; and a frequency offset between the CORESET #0 and the SS/PBCH block. For a first multiplexing pattern between the CORESET #0 and the SS/PBCH block, the frequency offset between the CORESET #0 and the SS/PBCH block is determined as one of 0, $N_{RB}^{CORESET\ \#0}-N_{RB}^{SSB}$, or $(N_{RB}^{CORESET\ \#0}-N_{RB}^{SSB})/2$, where $N_{RB}^{SSB}$ is a number of RBs for the SS/PBCH block. The BS further includes a transceiver operably coupled to the processor. The transceiver is configured to transmit the SS/PBCH block; and transmit the Type0-PDCCH based on the set of configurations for the CORESET #0 over a downlink channel.

In another embodiment, a user equipment (UE) in a wireless communication system is provided. The UE includes a transceiver configured to receive, from a BS, a SS/PBCH block and a processor operably coupled to the transceiver. The processor is configured to determine a set of configurations for a CORESET #0 to receive a Type0-PDCCH. The set of configurations includes a SCS for the CORESET #0, that is the same as a subcarrier spacing of the SS/PBCH block; a multiplexing pattern between the CORESET #0 and the SS/PBCH block; a number $N_{RB}^{CORESET\ \#0}$ of RBs for the CORESET #0; a number $N_{symbol}^{CORESET\ \#0}$ of symbols for the CORESET #0; and a frequency offset between the CORESET #0 and the SS/PBCH block. For a first multiplexing pattern between the CORESET #0 and the SS/PBCH block, the frequency offset between the CORESET #0 and the SS/PBCH block is determined as one of 0, $N_{RB}^{CORESET\ \#0}-N_{RB}^{SSB}$, or $(N_{RB}^{CORESET\ \#0}-N_{RB}^{SSB})/2$, where $N_{RB}^{SSB}$ is a number of RBs for the SS/PBCH block. The transceiver is further configured to receive the Type0-PDCCH based on the set of configurations for the CORESET #0 over a downlink channel.

In yet another embodiment, a method of a UE in a wireless communication system is provided. The method includes receiving, from a BS, a SS/PBCH block and determining a set of configurations for a CORESET #0 to receive a Type0-PDCCH. The set of configurations includes a SCS for the CORESET #0, that is the same as a subcarrier spacing of the SS/PBCH block; a multiplexing pattern between the CORESET #0 and the SS/PBCH block; a number $N_{RB}^{CORESET\ \#0}$ of RBs for the CORESET #0; a number $N_{symbol}^{CORESET\ \#0}$ of symbols for the CORESET #0; and a frequency offset between the CORESET #0 and the SS/PBCH block. For a first multiplexing pattern between the CORESET #0 and the SS/PBCH block, the frequency offset between the CORESET #0 and the SS/PBCH block is determined as one of 0, $N_{RB}^{CORESET\ \#0}-N_{RB}^{SSB}$, or $(N_{RB}^{CORESET\ \#0}-N_{RB}^{SSB})/2$, where $N_{RB}^{SSB}$ is a number of RBs for the SS/PBCH block. The method further includes receiving the Type0-PDCCH based on the set of configurations for the CORESET #0 over a downlink channel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR; Physical channels and modulation"; 3GPP TS 38.212 v16.1.0, "NR; Multiplexing and Channel coding"; 3GPP TS 38.213 v16.1.0, "NR; Physical Layer Procedures for Control"; 3GPP TS 38.214 v16.1.0, "NR; Physical Layer Procedures for Data"; and 3GPP TS 38.331 v16.1.0, "NR; Radio Resource Control (RRC) Protocol Specification."

Figure 1:
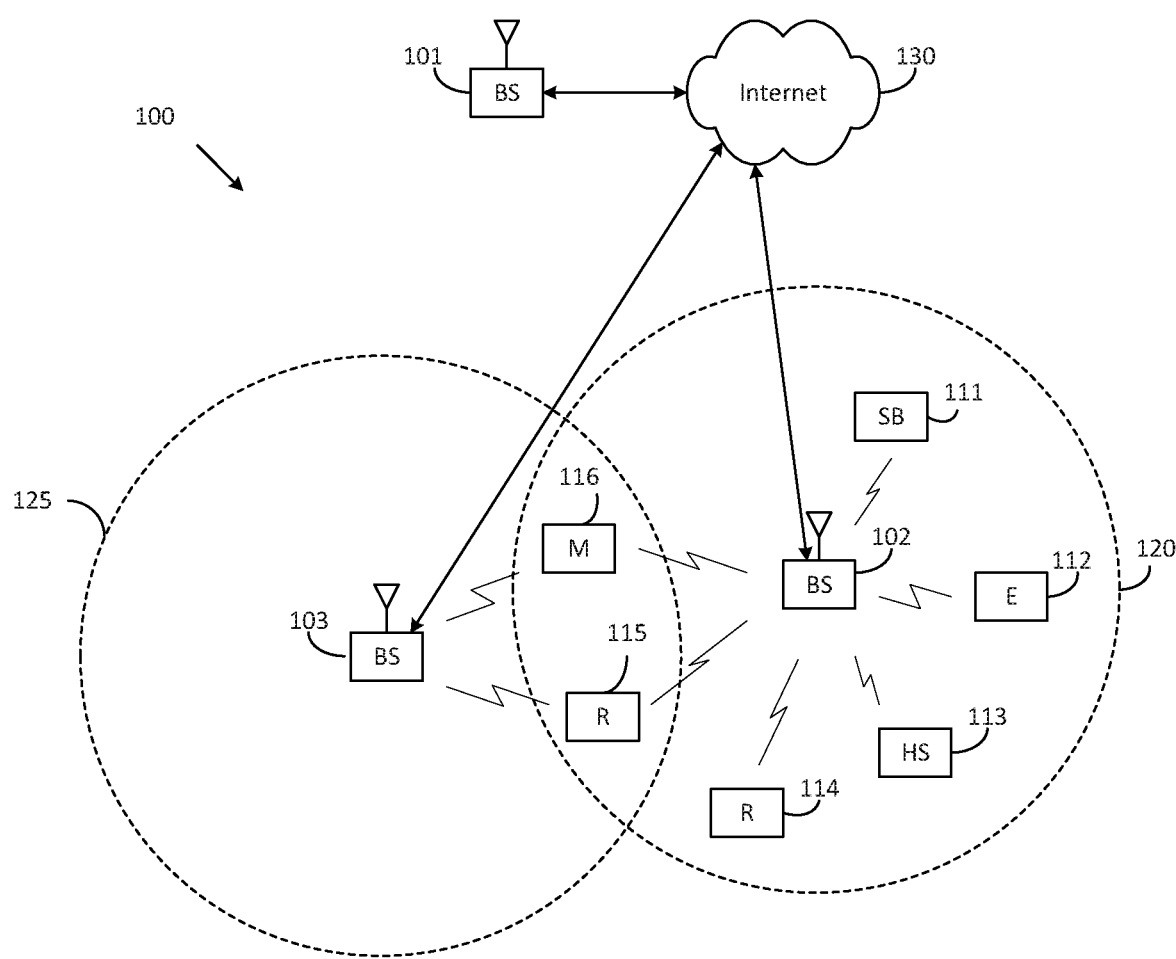
FIG. 1 illustrates an example wireless network according to embodiments of the present disclosure.
Figure 2:
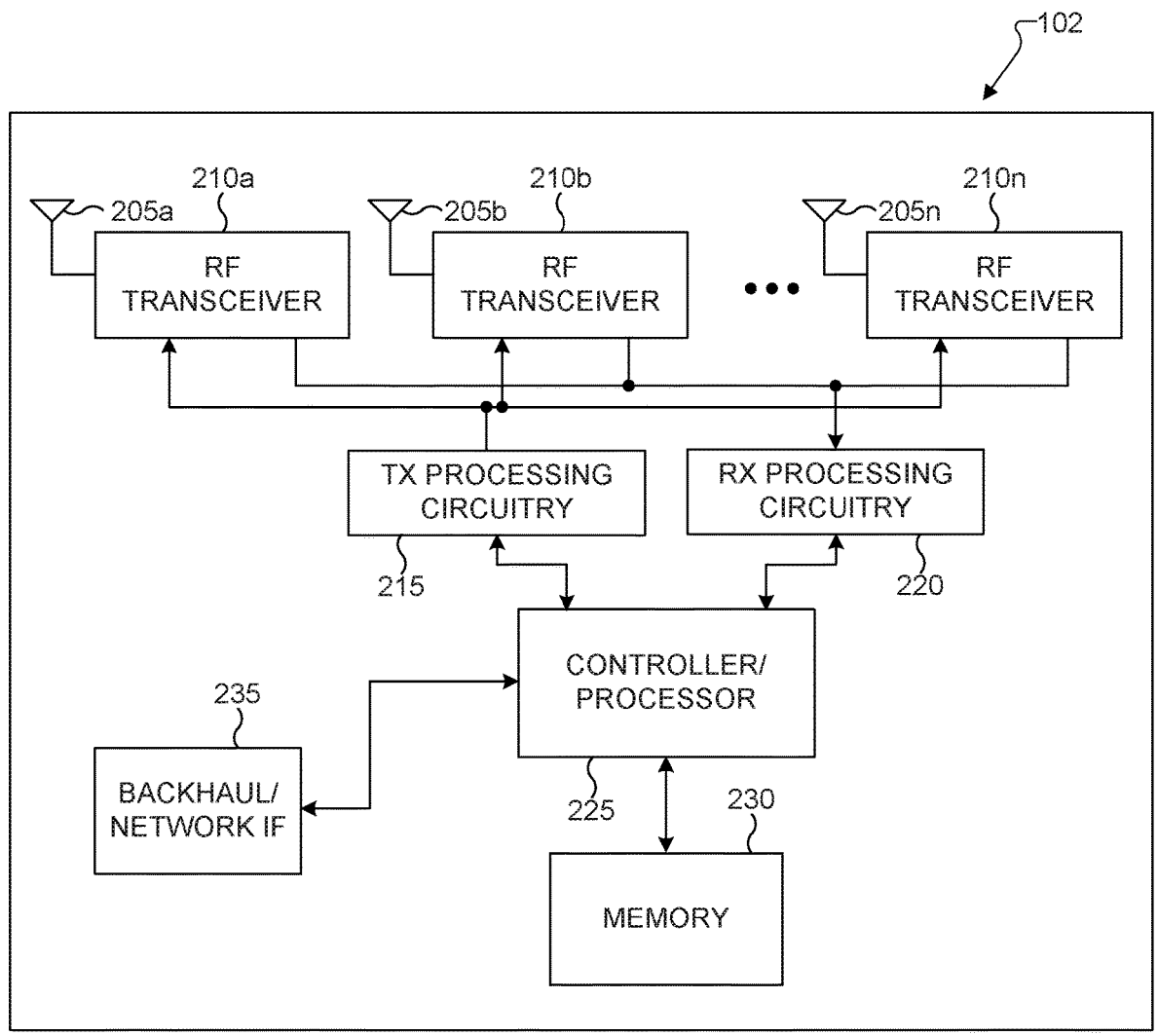
FIG. 2 illustrates an example gNB according to embodiments of the present disclosure.
Figure 3:
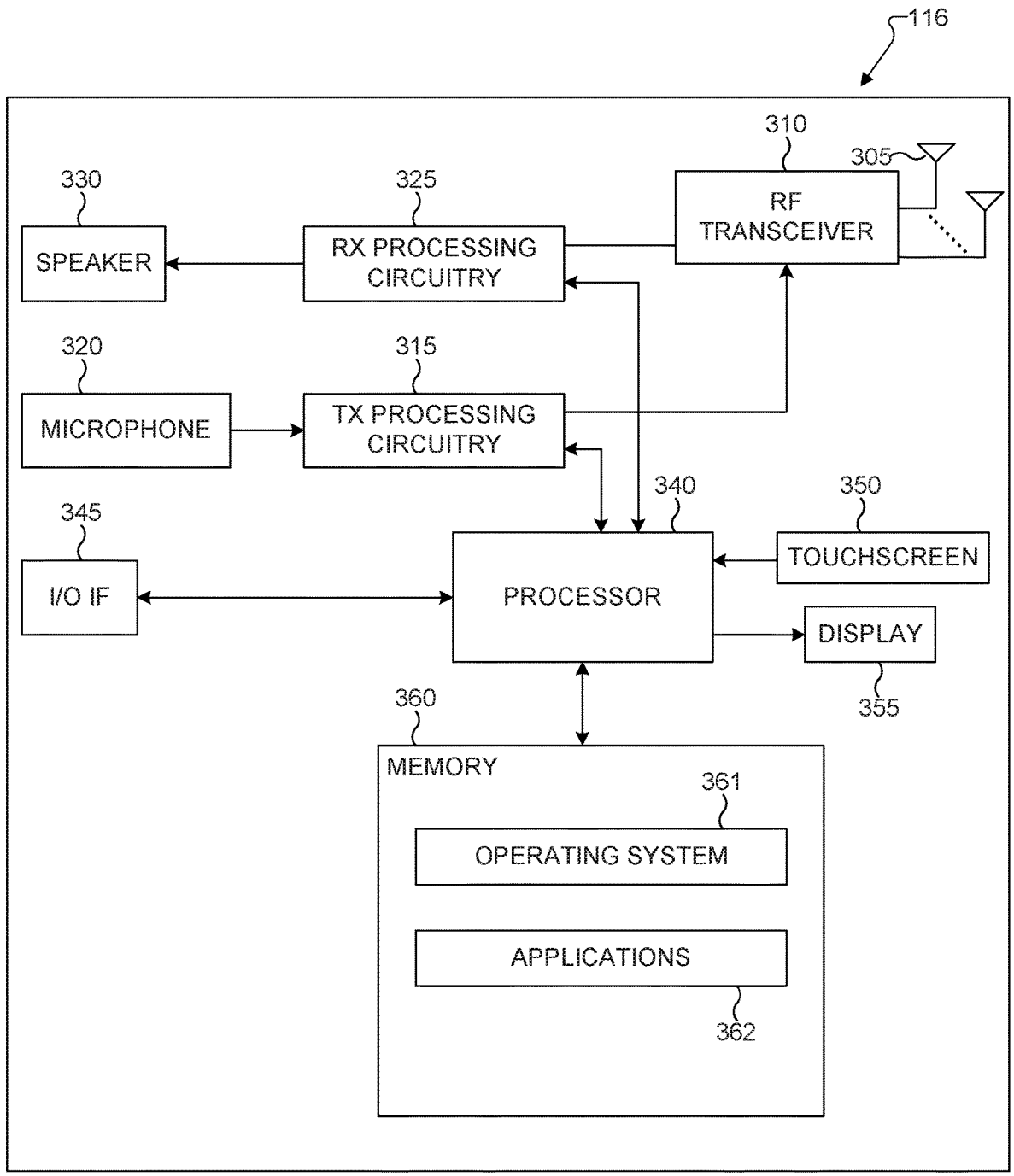
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), TRP, an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for enhancement to standalone operation for higher frequency range in a wireless communication system. In certain embodiments, and one or more of the gNBs 101-103 includes circuitry, programing, or a combination thereof, for enhancement to standalone operation for higher frequency range in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for enhancement to standalone operation for higher frequency range in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a RB. One RB includes a number of sub-carriers (SCs). For example, a slot can have duration of 0.5 milliseconds or 1 millisecond, include 14 symbols and an RB can include 12 SCs with inter-SC spacing of 30 KHz or 15 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
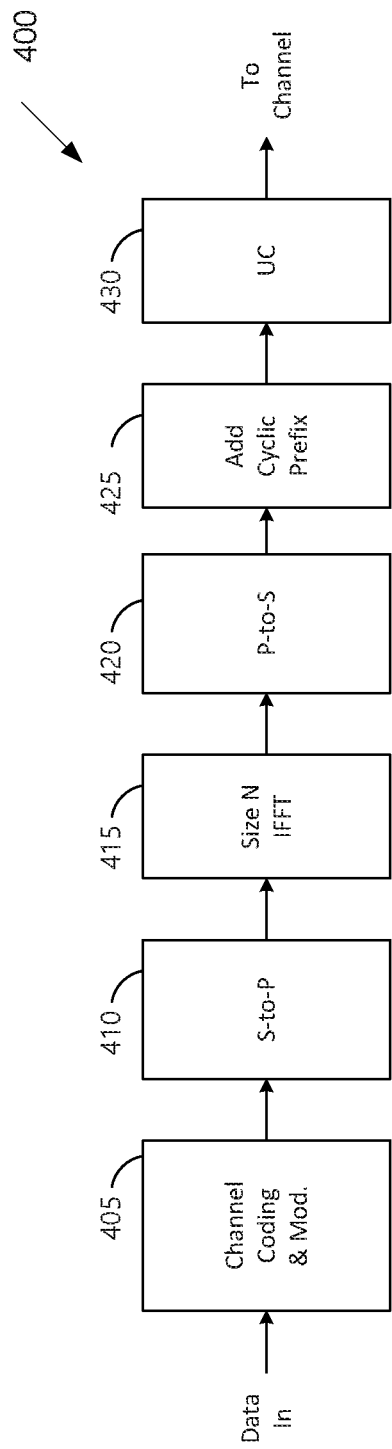
FIGS. 4 and 5 illustrate example wireless transmit and receive paths according to this disclosure.
Figure 5:
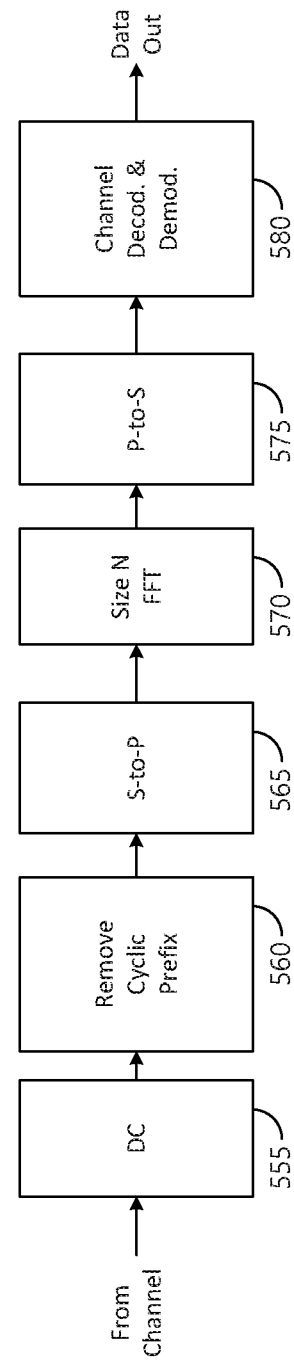

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the beam indication channel in a multi-beam system as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIGS. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

The present disclosure focuses on the design of synchronization raster and CORESET #0 configuration for higher frequency range. The present disclosure includes the design for both existing SCS for NR Rel-15 frequency range 2 (FR2) and new SCS such as 480 kHz and 960 kHz, considering the following aspects: (1) maximum step size for synchronization raster entries; (2) synchronization raster design; (3) frequency offset between SSB and CORESET #0; and (4) CORESET #0 configuration.

In NR Rel-15 and Rel-16, both 120 kHz and 240 kHz subcarrier spacing (SCS) can be utilized as the default SCS for initial cell search, wherein the synchronization raster entries for 240 kHz SCS have twice step size as the ones for 120 kHz SCS, as shown in TABLE 1. The definition of global synchronization channel number (GSCN) for FR2 is shown in TABLE 2, wherein one GSCN corresponds to 17.28 MHz (e.g., 12 RBs corresponding to 120 kHz SCS). For each of the GSCN entry, A UE can determine a SCS of the SS/PBCH block and detect the existing of an SS/PBCH block with the determined SCS at the frequency location corresponding to the GSCN entry.

TABLE 1

Applicable synchronization raster entries for operating bands in FR2.

| NR Operating Band | SSB SCS | SSB pattern | Range of GSCN (First-<Step size>-Last) |
|---|---|---|---|
| n257 | 120 kHz | Case D | 22388-<1>-22558 |
|      | 240 kHz | Case E | 22390-<2>-22556 |
| n258 | 120 kHz | Case D | 22257-<1>-22443 |
|      | 240 kHz | Case E | 22258-<2>-22442 |
| n259 | 120 kHz | Case D | 23140-<1>-23369 |
|      | 240 kHz | Case E | 23142-<2>-23368 |
| n260 | 120 kHz | Case D | 22995-<1>-23166 |
|      | 240 kHz | Case E | 22996-<2>-23164 |
| n261 | 120 kHz | Case D | 22446-<1>-22492 |
|      | 240 kHz | Case E | 22446-<2>-22490 |

TABLE 2

Global synchronization channel number entries for FR2.

| Frequency range | SSB frequency position $SS_{REF}$ | GSCN | Range of GSCN |
|---|---|---|---|
| 24250-100000 MHz | 24250.08 MHz + N * 17.28 MHz, N = 0:4383 | 22256 + N | 22256-26639 |

The UE can further determine a subcarrier of the Type0-PDCCH in the CORESET #0 associated with the detected SS/PBCH block, wherein the subcarrier of the Type0-PDCCH is provided in master information block (MIB) of the detected SS/PBCH block. For FR2, the subcarrier of the Type0-PDCCH is determined from either 60 kHz or 120 kHz. The UE can further determine a configuration of the CORESET #0 and a configuration of the Type0-PDCCH based on the combination of the SCS of SS/PBCH block and the SCS of the Type0-PDCCH in CORESET #0.

For a new carrier frequency range 52.6 GHz to 71 GHz, the design of the applicable synchronization raster entries can be different from FR2, such that the CORESET #0 configuration can be also different from FR2. Hence, there is a need for enhancement to the synchronization raster design and CORESET #configuration, using existing SCS as either 120 kHz or 240 kHz. Also, there is a need for further enhancement to the synchronization raster design and CORESET #0 configuration if new SCS, such as 480 kHz or 960 kHz, is utilized.

Although exemplary descriptions and embodiments to follow assume OFDM or OFDMA, the present disclosure can be extended to other OFDM-based transmission waveforms or multiple access schemes such as filtered OFDM (F-OFDM).

The present disclosure provides several components which can be used in conjunction or in combination with one another, or can operate as standalone schemes.

In one embodiment, the maximum step size for synchronization raster entries is determined based on the nominal channel bandwidth wherein the channel bandwidth is the minimum bandwidth to include the SS/PBCH block, wherein the step size is defined with respect to the unit of GSCN.

In one example, the maximum step size for synchronization raster entries $N_{GSCN}^{max}$ is given by $N_{GSCN}^{max} = \lfloor (N_{RB}^{CH} - N_{RB}^{SSB})/N_{RB}^{GSCN} \rfloor$, where $N_{RB}^{CH}$ is the number of RB of the nominal channel with minimum bandwidth to include the SS/PBCH block, $N_{RB}^{SSB}$ is the number of RB of the bandwidth of the SS/PBCH block (e.g., $N_{RB}^{SSB}=20$ if the SCS of SS/PBCH block is same as the SCS of the channel), $N_{RB}^{GSCN}$ is the number of RB regarding the SCS of the SS/PBCH block for defining a GSCN (e.g., 17.28 MHz).

Example maximum step size for synchronization raster entries $N_{GSCN}^{max}$, in term of GSCN values, is shown in TABLE 3.

TABLE 3

Example maximum step size for synchronization raster entries.

| SCS of SS/PBCH block | $N_{RB}^{CH}$ | $N_{RB}^{SSB}$ | $N_{RB}^{GSCN}$ | $N_{GSCN}^{max}$ |
|---|---|---|---|---|
| 120 kHz | 32  | 20 | 12  | 1 |
| 120 kHz | 66  | 20 | 12  | 3 |
| 120 kHz | 132 | 20 | 12  | 9 |
| 120 kHz | 264 | 20 | 12  | 20 |
| 120 kHz | 528 | 20 | 12  | 42 |
| 240 kHz | 32  | 20 | 6   | 2 |
| 240 kHz | 66  | 20 | 6   | 7 |
| 240 kHz | 132 | 20 | 6   | 18 |
| 240 kHz | 264 | 20 | 6   | 40 |
| 480 kHz | 32  | 20 | 3   | 4 |
| 480 kHz | 66  | 20 | 3   | 15 |
| 480 kHz | 132 | 20 | 3   | 37 |
| 960 kHz | 32  | 20 | 1.5 | 8 |
| 960 kHz | 66  | 20 | 1.5 | 30 |

In one embodiment, the synchronization raster entries applicable for a band are determined based on the applicable SCS of the SS/PBCH block (e.g., the default SCS of SS/PBCH block for initial cell search) and the minimum carrier bandwidth of the band.

In one example, if there is only one single SCS of the SS/PBCH block applicable for a given band, the step size for synchronization raster entries can be same as the maximum step size as described in this disclosure. Example step size of GSCN for synchronization raster entries, determined based on the minimum carrier bandwidth and single SCS of SS/PBCH block as 120 kHz is shown in TABLE 4.

TABLE 4

Example step size of GSCN for synchronization raster entries for single SCS of SS/PBCH block as 120 kHz.

| Minimum carrier bandwidth (MHz) | SCS of SS/PBCH block (kHz) | Step size of GSCN for sync raster entries |
|---|---|---|
| 50  | 120 | 1 |
| 100 | 120 | 3 |
| 200 | 120 | 9 |
| 400 | 120 | 20 |
| 800 | 120 | 42 |

In another example, if there are more than one SCS of the SS/PBCH block applicable for a given band, the step size for synchronization raster entries can be determined based on the maximum step sizes corresponding to the SCS of the SS/PBCH block as described in the present disclosure.

In a first sub-example, the step sizes for synchronization raster entries can be same as the maximum step size corresponding to the SCS of the SS/PBCH block.

Example step size of GSCN for synchronization raster entries, determined based on the minimum carrier bandwidth and multiple SCS of SS/PBCH block, is shown in TABLE 5. Note that if the supported SCS of SS/PBCH block is a subset from {120, 240, 480, 960} kHz, only the rows corresponding to the supported SCS are applicable.

TABLE 5

Example step size of GSCN for synchronization raster entries for multiple SCS of SS/PBCH block.

| Minimum carrier bandwidth (MHz) | SCS of SS/PBCH block (kHz) | Step size of GSCN for sync raster entries |
|---|---|---|
| 50 | 120 | 1 |
|  | 240 | 2 |
|  | 480 | 4 |
|  | 960 | 8 |
| 100 | 120 | 3 |
|  | 240 | 2 |
|  | 480 | 4 |
|  | 960 | 8 |
| 200 | 120 | 9 |
|  | 240 | 7 |
|  | 480 | 4 |
|  | 960 | 8 |
| 400 | 120 | 20 |
|  | 240 | 18 |
|  | 480 | 15 |
|  | 960 | 8 |
| 800 | 120 | 42 |
|  | 240 | 40 |
|  | 480 | 37 |
|  | 960 | 30 |

In a second sub-example, the step sizes for synchronization raster entries can be the same for all the SCSs and equals to the minimum of the maximum step sizes corresponding to the SCSs of the SS/PBCH block. Example step size of GSCN for synchronization raster entries, determined based on the minimum carrier bandwidth and multiple SCS of SS/PBCH block is shown in TABLE 6. Note that for a given minimum carrier bandwidth, only one row of the example in the table is applicable depending on the supported SCS of SS/PBCH block for initial cell search, and the single value of the step size of GSCN for sync raster entries in the table is applicable to all the supported SCS of SS/PBCH block.

TABLE 6

Example step size of GSCN for synchronization raster entries for multiple SCS of SS/PBCH block.

| Minimum carrier bandwidth (MHz) | SCS of SS/PBCH block (kHz) | Step size of GSCN for sync raster entries |
|---|---|---|
| 50 | 120, 240 | 1 |
|  | 120, 480 | 1 |
|  | 120, 960 | 1 |
|  | 120, 240, 480 | 1 |
|  | 120, 240, 960 | 1 |
|  | 120, 480, 960 | 1 |
|  | 120, 240, 480, 960 | 1 |
| 100 | 120, 240 | 2 |
|  | 120, 480 | 3 |
|  | 120, 960 | 3 |
|  | 120, 240, 480 | 2 |
|  | 120, 240, 960 | 2 |
|  | 120, 480, 960 | 3 |
|  | 120, 240, 480, 960 | 2 |
| 200 | 120, 240 | 7 |
|  | 120, 480 | 4 |
|  | 120, 960 | 8 |
|  | 120, 240, 480 | 4 |
|  | 120, 240, 960 | 7 |
|  | 120, 480, 960 | 4 |
|  | 120, 240, 480, 960 | 4 |

TABLE 6-continued

Example step size of GSCN for synchronization raster entries for multiple SCS of SS/PBCH block.

| Minimum carrier bandwidth (MHz) | SCS of SS/PBCH block (kHz) | Step size of GSCN for sync raster entries |
|---|---|---|
| 400 | 120, 240 | 18 |
|  | 120, 480 | 15 |
|  | 120, 960 | 8 |
|  | 120, 240, 480 | 15 |
|  | 120, 240, 960 | 8 |
|  | 120, 480, 960 | 8 |
|  | 120, 240, 480, 960 | 8 |
| 800 | 120, 240 | 40 |
|  | 120, 480 | 37 |
|  | 120, 960 | 30 |
|  | 120, 240, 480 | 37 |
|  | 120, 240, 960 | 30 |
|  | 120, 480, 960 | 30 |
|  | 120, 240, 480, 960 | 30 |

In a third sub-example, the step sizes for synchronization raster entries can be taking value not exceeding the maximum step size, and try to maximize the number of overlapped synchronization raster entries. For example, every step size corresponding to a first SCS of the SS/PBCH block can be dividable by the minimum step size corresponding to a second SCS of the SS/PBCH block. Example step size of GSCN for synchronization raster entries, determined based on the minimum carrier bandwidth and dual SCS of SS/PBCH block is shown in TABLE 7. Note that for a given minimum carrier bandwidth, only one row of the example in the table is applicable depending on the supported SCS of SS/PBCH block for initial cell search, and the values of the step size of GSCN for sync raster entries in the table are applicable to the supported SCS of SS/PBCH block, respectively.

TABLE 7

Example step size of GSCN for synchronization raster entries for multiple SCS of SS/PBCH block.

| Minimum carrier bandwidth (MHz) | SCS of SS/PBCH block (kHz) | Step size of GSCN for sync raster entries |
|---|---|---|
| 50 | 120, 240 | 1, 2 |
|  | 120, 480 | 1, 4 |
|  | 120, 960 | 1, 8 |
|  | 120, 240, 480 | 1, 2, 4 |
|  | 120, 240, 960 | 1, 2, 8 |
|  | 120, 480, 960 | 1, 4, 8 |
|  | 120, 240, 480, 960 | 1, 2, 4, 8 |
| 100 | 120, 240 | 2, 2 |
|  | 120, 480 | 3, 3 |
|  | 120, 960 | 3, 6 |
|  | 120, 240, 480 | 2, 2, 4 |
|  | 120, 240, 960 | 2, 2, 8 |
|  | 120, 480, 960 | 3, 3, 6 |
|  | 120, 240, 480, 960 | 2, 2, 4, 8 |
| 200 | 120, 240 | 7, 7 |
|  | 120, 480 | 8, 4 |
|  | 120, 960 | 8, 8 |
|  | 120, 240, 480 | 4, 4, 4 |
|  | 120, 240, 960 | 7, 7, 7 |
|  | 120, 480, 960 | 8, 4, 8 |
|  | 120, 240, 480, 960 | 8, 4, 4, 8 |
| 400 | 120, 240 | 18, 18 |
|  | 120, 480 | 15, 15 |
|  | 120, 960 | 16, 8 |
|  | 120, 240, 480 | 15, 15, 15 |
|  | 120, 240, 960 | 16, 16, 8 |
|  | 120, 480, 960 | 16, 8, 8 |
|  | 120, 240, 480, 960 | 16, 16, 8, 8 |

TABLE 7-continued

Example step size of GSCN for synchronization raster entries for multiple SCS of SS/PBCH block.

| Minimum carrier bandwidth (MHz) | SCS of SS/PBCH block (kHz) | Step size of GSCN for sync raster entries |
|---|---|---|
| 800 | 120, 240 | 40, 40 |
| | 120, 480 | 37, 37 |
| | 120, 960 | 30, 30 |
| | 120, 240, 480 | 37, 37, 37 |
| | 120, 240, 960 | 30, 30, 30 |
| | 120, 480, 960 | 30, 30, 30 |
| | 120, 240, 480, 960 | 30, 30, 30, 30 |

In one embodiment, the frequency offset between the first RB of SS/PBCH block and first RB of CORESET #0 can be indicated in the MIB of the SS/PBCH block. For a given CORESET #0 bandwidth, the minimum number of configurable frequency offsets between SS/PBCH block and its associated CORESET #0 in multiplexing Pattern 1 is given by $\lceil N_{RB}^{step}/(N_{RB}^{carrier} - N_{RB}^{CORESET\ \#0} + 1) \rceil$, wherein $N_{RB}^{step}$ is the step size of sync raster entries in term of RB with respect to the SCS of the Type0-PDCCH in CORESET #0 (e.g., 1 GSCN corresponds to 12 RBs in 120 kHz SCS), $N_{RB}^{carrier}$ is the carrier bandwidth containing CORESET #0, and $N_{RB}^{CORESET\ \#0}$ is the configured CORESET #0 bandwidth.

Example minimum number of configurable frequency offset between SS/PBCH block and CORESET #0 for SCS of Type0-PDCCH in CORESET #0 as 120 kHz in multiplexing Pattern 1, for minimum carrier bandwidth as 50 MHz, 100 MHz, 200 MHz, 400 MHz, and 800 MHz, are shown in TABLE 8-1 to TABLE 8-5, respectively.

TABLE 8-1

Example minimum number of configurable frequency offset between SS/PBCH block and CORESET#0 for SCS of Type0-PDCCH in CORESET#0 as 120 kHz in Pattern 1, for minimum channel bandwidth as 50 MHz.

| Step size of GSCN for sync raster entries | $N_{RB}^{step}$ | $N_{RB}^{carrier}$ | $N_{RB}^{CORSET\#0}$ | Minimum number of frequency offsets |
|---|---|---|---|---|
| 1 | 12 | 32 | 24 | 2 |
| 1 | 12 | 66 | 48 | 1 |
| 1 | 12 | 132 | 96 | 1 |
| 2 | 24 | 66 | 48 | 2 |
| 2 | 24 | 132 | 96 | 1 |

TABLE 8-2

Example minimum number of configurable frequency offset between SS/PBCH block and CORESET#0 for SCS of Type0-PDCCH in CORESET#0 as 120 kHz in Pattern 1, for minimum channel bandwidth as 100 MHz.

| Step size of GSCN for sync raster entries | $N_{RB}^{step}$ | $N_{RB}^{carrier}$ | $N_{RB}^{CORESET\#0}$ | Minimum number of frequency offsets |
|---|---|---|---|---|
| 3 | 36 | 66 | 24 | 1 |
| 3 | 36 | 66 | 48 | 2 |
| 3 | 36 | 132 | 96 | 1 |
| 2 | 24 | 66 | 24 | 1 |
| 2 | 24 | 66 | 48 | 2 |
| 2 | 24 | 132 | 96 | 1 |

TABLE 8-3

Example minimum number of configurable frequency offset between SS/PBCH block and CORESET#0 for SCS of Type0-PDCCH in CORESET#0 as 120 kHz in Pattern 1, for minimum channel bandwidth as 200 MHz.

| Step size of GSCN for sync raster entries | $N_{RB}^{step}$ | $N_{RB}^{carrier}$ | $N_{RB}^{CORESET\#0}$ | Minimum number of frequency offsets |
|---|---|---|---|---|
| 9 | 108 | 132 | 24 | 1 |
| 9 | 108 | 132 | 48 | 2 |
| 9 | 108 | 132 | 96 | 3 |
| 7 | 84 | 132 | 48 | 1 |
| 7 | 84 | 132 | 96 | 3 |

TABLE 8-4

Example minimum number of configurable frequency offset between SS/PBCH block and CORESET#0 for SCS of Type0-PDCCH in CORESET#0 as 120 kHz in Pattern 1, for minimum channel bandwidth as 400 MHz.

| Step size of GSCN for sync raster entries | $N_{RB}^{step}$ | $N_{RB}^{carrier}$ | $N_{RB}^{CORESET\#0}$ | Minimum number of frequency offsets |
|---|---|---|---|---|
| 20 | 240 | 264 | 24 | 1 |
| 20 | 240 | 264 | 48 | 2 |
| 20 | 240 | 264 | 96 | 2 |
| 18 | 216 | 264 | 48 | 1 |
| 18 | 216 | 264 | 96 | 2 |

TABLE 8-5

Example minimum number of configurable frequency offset between SS/PBCH block and CORESET#0 for SCS of Type0-PDCCH in CORESET#0 as 120 kHz in Pattern 1, for minimum channel bandwidth as 800 MHz.

| Step size of GSCN for sync raster entries | $N_{RB}^{step}$ | $N_{RB}^{carrier}$ | $N_{RB}^{CORESET\#0}$ | Minimum number of frequency offsets |
|---|---|---|---|---|
| 42 | 504 | 528 | 24 | 1 |
| 42 | 504 | 528 | 48 | 2 |
| 42 | 504 | 528 | 96 | 2 |
| 40 | 480 | 528 | 48 | 1 |
| 40 | 480 | 528 | 96 | 2 |

In one embodiment, example minimum number of configurable frequency offset between SS/PBCH block and CORESET #0 for SCS of Type0-PDCCH in CORESET #0 as 480 kHz in multiplexing Pattern 1, for minimum carrier bandwidth as 50 MHz/100 MHz/200 MHz, 400 MHz, and 800 MHz, are shown in TABLE 9-1 to TABLE 9-3, respectively.

TABLE 9-1

Example minimum number of configurable frequency offset between SS/PBCH block and CORESET#0 for SCS of Type0-PDCCH in CORESET#0 as 480 kHz in Pattern 1, for minimum channel bandwidth as 50/100/200 MHz.

| Step size of GSCN for sync raster entries | $N_{RB}^{step}$ | $N_{RB}^{carrier}$ | $N_{RB}^{CORESET\#0}$ | Minimum number of frequency offsets |
|---|---|---|---|---|
| 4 | 12 | 32 | 24 | 2 |
| 4 | 12 | 66 | 48 | 1 |
| 4 | 12 | 132 | 96 | 1 |

TABLE 9-2

Example minimum number of configurable frequency offset between SS/PBCH block and CORESET#0 for SCS of Type0-PDCCH in CORESET#0 as 480 kHz in Pattern 1, for minimum channel bandwidth as 400 MHz.

| Step size of GSCN for sync raster entries | $N_{RB}^{step}$ | $N_{RB}^{carrier}$ | $N_{RB}^{CORESET\#0}$ | Minimum number of frequency offsets |
|---|---|---|---|---|
| 15 | 45 | 66 | 24 | 2 |
| 15 | 45 | 66 | 48 | 3 |
| 15 | 45 | 132 | 96 | 2 |
| 14 | 42 | 66 | 24 | 1 |
| 14 | 42 | 66 | 48 | 3 |
| 14 | 42 | 132 | 96 | 2 |
| 12 | 36 | 66 | 24 | 1 |
| 12 | 36 | 66 | 48 | 2 |
| 12 | 36 | 132 | 96 | 1 |
| 10 | 30 | 66 | 24 | 1 |
| 10 | 30 | 66 | 48 | 2 |
| 10 | 30 | 132 | 96 | 1 |
| 9 | 27 | 66 | 24 | 1 |
| 9 | 27 | 66 | 48 | 2 |
| 9 | 27 | 132 | 96 | 1 |
| 8 | 24 | 66 | 24 | 1 |
| 8 | 24 | 66 | 48 | 2 |
| 8 | 24 | 132 | 96 | 1 |

TABLE 9-3

Example minimum number of configurable frequency offset between SS/PBCH block and CORESET#0 for SCS of Type0-PDCCH in CORESET#0 as 480 kHz in Pattern 1, for minimum channel bandwidth as 800 MHz.

| Step size of GSCN for sync raster entries | $N_{RB}^{step}$ | $N_{RB}^{carrier}$ | $N_{RB}^{CORESET\#0}$ | Minimum number of frequency offsets |
|---|---|---|---|---|
| 37 | 111 | 132 | 24 | 2 |
| 37 | 111 | 132 | 48 | 2 |
| 37 | 111 | 132 | 96 | 3 |

In one embodiment, example minimum number of configurable frequency offset between SS/PBCH block and CORESET #0 for SCS of Type0-PDCCH in CORESET #0 as 960 kHz in multiplexing Pattern 1, for minimum carrier bandwidth as 50 MHz/100 MHz/200 MHz/400 MHz, and 800 MHz, are shown in TABLE 10-1 and TABLE 10-2, respectively.

TABLE 10-1

Example minimum number of configurable frequency offset between SS/PBCH block and CORESET#0 for SCS of Type0-PDCCH in CORESET#0 as 480 kHz in Pattern 1, for minimum channel bandwidth as 50/100/200/400 MHz.

| Step size of GSCN for sync raster entries | $N_{RB}^{step}$ | $N_{RB}^{carrier}$ | $N_{RB}^{CORESET\#0}$ | Minimum number of frequency offsets |
|---|---|---|---|---|
| 8 | 12 | 32 | 24 | 2 |
| 8 | 12 | 66 | 48 | 1 |
| 8 | 12 | 132 | 96 | 1 |

TABLE 10-2

Example minimum number of configurable frequency offset between SS/PBCH block and CORESET#0 for SCS of Type0-PDCCH in CORESET#0 as 480 kHz in Pattern 1, for minimum channel bandwidth as 800 MHz.

| Step size of GSCN for sync raster entries | $N_{RB}^{step}$ | $N_{RB}^{carrier}$ | $N_{RB}^{CORESET\#0}$ | Minimum number of frequency offsets |
|---|---|---|---|---|
| 30 | 45 | 66 | 24 | 2 |
| 30 | 45 | 66 | 48 | 3 |
| 30 | 45 | 132 | 96 | 2 |

In one embodiment, for any of above examples, given a CORESET #0 bandwidth and a step size of GSCN for sync raster entries, the minimum number of frequency offsets is no more than 3, and the at most 3 values of the frequency offsets can be selected from $\{0, N_{RB}^{CORESET\ \#0} - N_{RB}^{SSB}, (N_{RB}^{CORESET\ \#0} - N_{RB}^{SSB})/2\}$, wherein $N_{RB}^{CORESET\ \#0}$ is the CORESET #0 bandwidth in term of RB, and $N_{RB}^{SSB}$ is the SS/PBCH block bandwidth in term of RB with respect to the SCS of CORESET #0. The three values of the offsets 0, $N_{RB}^{CORESET\ \#0} - N_{RB}^{SSB}$, and $(N_{RB}^{CORESET\ \#0} - N_{RB}^{SSB})/2$ correspond to bottom aligned, top aligned, and center aligned between CORESET #0 and SS/PBCH block, respectively, and the corresponding illustration is shown as Case A, Case B, and Case C in FIG. 6.

Figure 6:
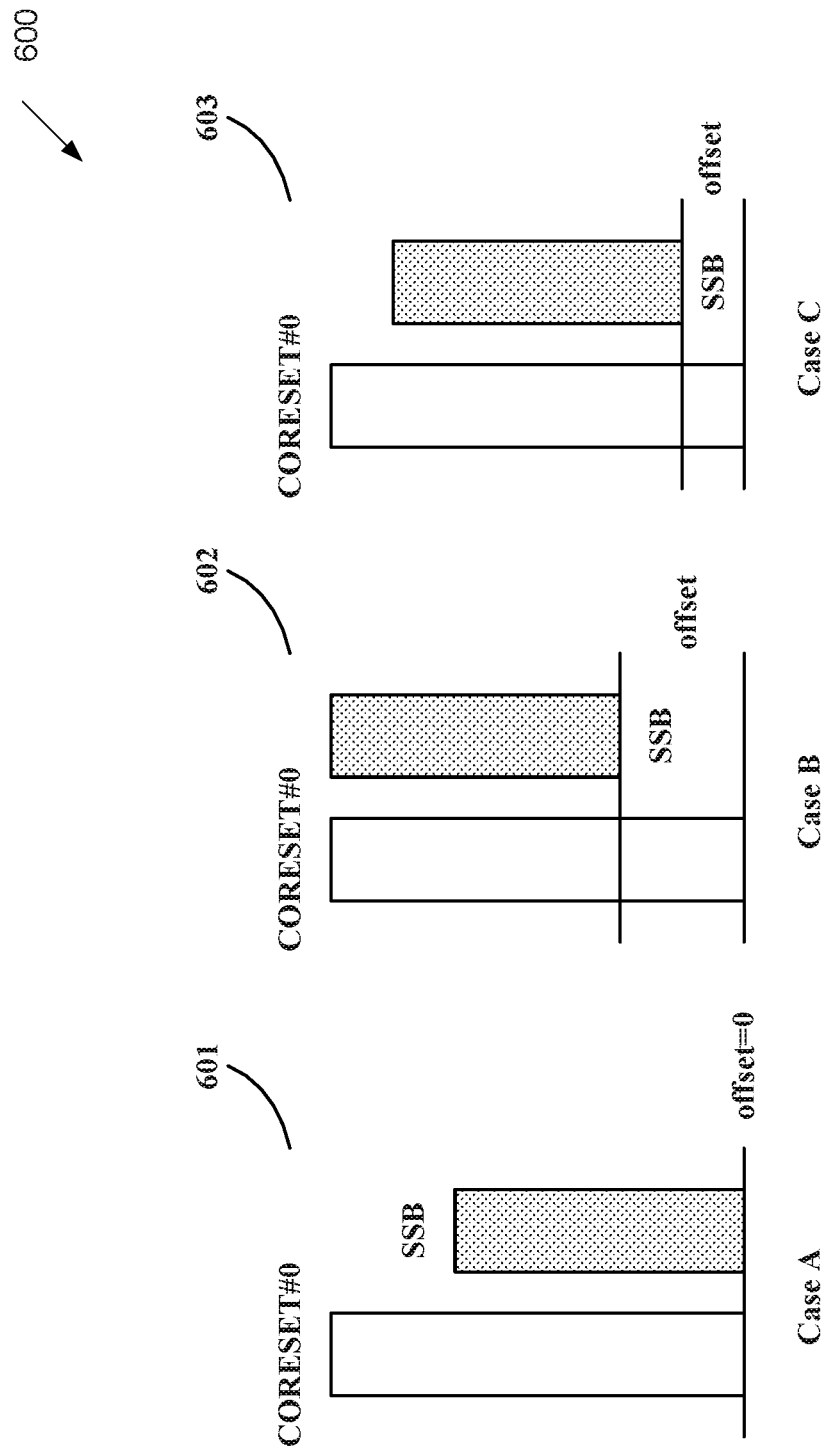
FIG. 6 illustrates an example of three offsets between CORESET #0 and SS/PBCH block according to embodiments of the present disclosure.

FIG. 6 illustrates an example of three offsets between CORESET #0 and SS/PBCH block 600 according to embodiments of the present disclosure. An embodiment of the three offsets between CORESET #0 and SS/PBCH block 600 shown in FIG. 6 is for illustration only.

In another further example, the actual configurable number of frequency offsets can be larger than the minimum number of frequency offsets, e.g., for the flexibility of implementation, as long as the total number of CORESET #0 configurations in MIB can still be limited within a particular number (e.g., 16 configurations).

In one example, when the minimum number of frequency offsets is determined as 1, the actual number of configurable number of frequency offsets can be 2, and their values can be given by 0 and $N_{RB}^{CORESET\ \#0} - N_{RB}^{SSB}$, corresponding to top aligned (Case A in FIG. 6) and bottom aligned (Case B in FIG. 6), respectively.

In another example, when the minimum number of frequency offsets is determined as 1 or 2, the actual number of configurable number of frequency offsets can be 3, and their values can be given by 0, $N_{RB}^{CORESET\ \#0} - N_{RB}^{SSB}$, and $(N_{RB}^{CORESET\ \#0} - N_{RB}^{SSB})/2$, corresponding to top aligned (Case A in FIG. 6), bottom aligned (Case B in FIG. 6), and center aligned (Case C in FIG. 6), respectively.

Some example actual configurable frequency offset between CORESET #0 and SS/PBCH block, when SCS of SS/PBCH block and SCS of Type0-PDCCH in CORESET #0 are the same (e.g., both are 120 kHz or 480 kHz or 960 kHz), is shown in TABLE 11.

TABLE 11

Example frequency offset between CORESET#0 and SS/PBCH block when SCS of SS/PBCH block and SCS of Type0-PDCCH in CORESET#0 are the same (multiplexing pattern 1).

| $N_{RB}^{CORESET\#0}$ | Minimum number of frequency offsets | Actual configurable number of frequency offsets | Frequency offset notation | Example frequency offsets | Corresponding cases in FIGURE 6 |
|---|---|---|---|---|---|
| 24 | 1 | 1 | $O_{\{24,1,1\}}$ | 0 | Case A |
|  |  |  |  | 4 | Case B |
|  |  |  |  | 2 | Case C |
| 24 | 1 or 2 | 2 | $O_{\{24,2,1\}}$, $O_{\{24,2,2\}}$ | 0, 4 | Case A, and B |
|  |  |  |  | 0, 2 | Case A, and C |
|  |  |  |  | 4, 2 | Case B, and C |
| 24 | 1 or 2 or 3 | 3 | $O_{\{24,3,1\}}$, $O_{\{24,3,2\}}$, $O_{\{24,3,3\}}$ | 0, 4, 2 | Case A, B, and C |
| 48 | 1 | 1 | $O_{\{48,1,1\}}$ | 0 | Case A |
|  |  |  |  | 28 | Case B |
|  |  |  |  | 14 | Case C |
| 48 | 1 or 2 | 2 | $O_{\{48,2,1\}}$, $O_{\{48,2,2\}}$ | 0, 28 | Case A, and B |
|  |  |  |  | 0, 14 | Case A, and C |
|  |  |  |  | 28, 14 | Case B, and C |
| 48 | 1 or 2 or 3 | 3 | $O_{\{48,3,1\}}$, $O_{\{48,3,2\}}$, $O_{\{48,3,3\}}$ | 0, 28, 14 | Case A, B, and C |
| 96 | 1 | 1 | $O_{\{96,1,1\}}$ | 0 | Case A |
|  |  |  |  | 76 | Case B |
|  |  |  |  | 38 | Case C |
| 96 | 1 or 2 | 2 | $O_{\{96,2,1\}}$, $O_{\{96,2,2\}}$ | 0, 76 | Case A, and B |
|  |  |  |  | 0, 38 | Case A, and C |
|  |  |  |  | 76, 38 | Case B, and C |
| 96 | 1 or 2 or 3 | 3 | $O_{\{96,3,1\}}$, $O_{\{96,3,2\}}$, $O_{\{96,3,3\}}$ | 0, 76, 38 | Case A, B, and C |

Some example actual configurable frequency offset between CORESET #0 and SS/PBCH block, when SCS of SS/PBCH block is 240 kHz and SCS of Type0-PDCCH in CORESET #0 is 120 kHz, is shown in TABLE 12.

TABLE 12

Example frequency offset between CORESET#0 and SS/PBCH block when SCS of SS/PBCH block is 240 kHz and SCS of Type0-PDCCH in CORESET#0 is 120 kHz (multiplexing pattern 1).

| $N_{RB}^{CORESET\#0}$ | Minimum number of frequency offsets | Actual configurable number of frequency offsets | Example frequency offsets | Corresponding cases in FIGURE 6 |
|---|---|---|---|---|
| 48 | 1 | 1 | 0 | Case A |
|  |  |  | 8 | Case B |
|  |  |  | 4 | Case C |
| 48 | 1 or 2 | 2 | 0, 8 | Case A, and B |

TABLE 12-continued

Example frequency offset between CORESET#0 and SS/PBCH block when SCS of SS/PBCH block is 240 kHz and SCS of Type0-PDCCH in CORESET#0 is 120 kHz (multiplexing pattern 1).

| $N_{RB}^{CORESET\#0}$ | Minimum number of frequency offsets | Actual configurable number of frequency offsets | Example frequency offsets | Corresponding cases in FIGURE 6 |
|---|---|---|---|---|
|  |  |  | 0, 4 | Case A, and C |
|  |  |  | 8, 4 | Case B, and C |
| 48 | 1 or 2 | 3 | 0, 8, 4 | Case A, B, and C |
| 96 | 1 | 1 | 0 | Case A |
|  |  |  | 56 | Case B |
|  |  |  | 28 | Case C |
| 96 | 1 or 2 | 2 | 0, 56 | Case A, and B |
|  |  |  | 0, 28 | Case A, and C |
|  |  |  | 56, 28 | Case B, and C |
| 96 | 1 or 2 or 3 | 3 | 0, 56, 28 | Case A, B, and C |

In one embodiment, for a higher frequency range (e.g., 52.6 to 71 GHz), an enhancement to the CORESET #0 configuration for SCS of Type0-PDCCH in CORESET #0 as 120 kHz can be supported, e.g., to accommodate the feature of the higher frequency range.

In one example, when SCS of SS/PBCH block as 120 kHz and SCS of Type0-PDCCH in CORESET #0 as 120 kHz, the CORESET #0 bandwidth can be configured as 96 RBs in term of 120 kHz SCS, and part or all of the following example configurations in TABLE 13 can be supported in addition to Rel-15 CORESET #0 configuration table, wherein $N_{symbol}^{CORESET\ \#0}$ is the number of symbol for CORESET #0.

TABLE 13

Example enhancement to CORESET#0 configuration when {SS/PBCH block, PDCCH} SCS is {120, 120} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| — | 1 | 96 | 1 | 0 |
| — | 1 | 96 | 1 | 38 |
| — | 1 | 96 | 1 | 76 |
| — | 1 | 96 | 2 | 0 |
| — | 1 | 96 | 2 | 38 |
| — | 1 | 96 | 2 | 76 |

In another example, when SCS of SS/PBCH block as 240 kHz and SCS of Type0-PDCCH in CORESET #0 as 120 kHz, the CORESET #0 bandwidth can be configured as 96 RBs in term of 120 kHz SCS, and all or part of the following example configurations in TABLE 14 can be supported in addition to Rel-15 CORESET #0 configuration table, wherein $N_{symbol}^{CORESET\ \#0}$ is the number of symbol for CORESET #0.

TABLE 14

Example enhancement to CORESET#0 configuration
when {SS/PBCH block, PDCCH} SCS is {240, 120} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| — | 1 | 96 | 1 | 0 |
| — | 1 | 96 | 1 | 28 |
| — | 1 | 96 | 1 | 56 |
| — | 1 | 96 | 2 | 0 |
| — | 1 | 96 | 2 | 28 |
| — | 1 | 96 | 2 | 56 |

In yet another example, when SCS of SS/PBCH block as 120 kHz and SCS of Type0-PDCCH in CORESET #0 as 120 kHz, if the minimum carrier bandwidth is larger than 50 MHz, the number of configurable frequency offsets when CORESET #0 bandwidth $N_{RB}^{CORESET\#0}=48$ RB can be enhanced.

For a first sub-example, for CORESET #0 bandwidth $N_{RB}^{CORESET\#0}=48$ RB, the following example configurations in TABLE 15-1 can be added to the Rel-15 CORESET #0 configurations, wherein two additional offsets 0 and 28 can be configured in addition to the one supported in Rel-15 (e.g., 14 RB), and this enhancement is applicable to the number of symbols for CORESET #0 as either 1 or 2.

For a second sub-example, for CORESET #0 bandwidth $N_{RB}^{CORESET\#0}=48$ RB, the following example configurations in TABLE 15-1 can replace the Rel-15 CORESET #0 configurations (i.e., offset as 14 RB), wherein the two new offsets 0 and 28 can be configured, instead of a fixed offset 14 RB as in Rel-15, and this enhancement is applicable to the number of symbols for CORESET #0 as either 1 or 2.

For a third sub-example, for CORESET #0 bandwidth $N_{RB}^{CORESET\#0}=48$ RB, part of the following example configurations in TABLE 15-1 can be added to the Rel-15 CORESET #0 configurations, wherein either an additional offset as 0 or as 28 can be further configured in addition to the one supported in Rel-15 (e.g., 14 RB), and this enhancement is applicable to the number of symbols for CORESET #0 as either 1 or 2. For one instance, the configurations with index X and X+2 in TABLE 15-1 are supported in addition to Rel-15 configurations. For another instance, the configurations with index X+1 and X+3 in TABLE 15-1 are supported in addition to Rel-15 configurations. In TABLE 15-1, $N_{symbol}^{CORESET\#0}$ is the number of symbol for CORESET #0.

TABLE 15-1

Example enhancement to CORESET#0 configuration
when {SS/PBCH block, PDCCH} SCS is {120, 120} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| X | 1 | 48 | 1 | 0 |
| X + 1 | 1 | 48 | 1 | 28 |
| X + 2 | 1 | 48 | 2 | 0 |
| X + 3 | 1 | 48 | 2 | 28 |

In one example, example CORESET #0 configuration table when {SS/PBCH block, PDCCH} SCS is {120, 120} kHz is given by TABLE 15-2 to TABLE 15-8, wherein the offset values $O_{\{*,*,*\}}$ is given by Table 11, and offset values $P_{\{*,*,*\}}$ can be given by the following sub-example: for one sub-example, $P_{\{24,2,1\}}=P_{\{48,2,1\}}=-20$ if $k_{SSB}=0$; $P_{\{24,2,1\}}=P_{\{48,2,1\}}=-21$ if $k_{SSB}>0$; and $P_{\{24,2,2\}}=24$, $P_{\{48,2,2\}}=48$.

TABLE 15-2

Example enhancement to CORESET#0 configuration
when {SS/PBCH block, PDCCH} SCS is {120, 120} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,1,1\}}$ |
| 1 | 1 | 48 | 1 | $O_{\{48,2,1\}}$ |
| 2 | 1 | 48 | 1 | $O_{\{48,2,1\}}$ |
| 3 | 1 | 48 | 2 | $O_{\{48,2,1\}}$ |
| 4 | 1 | 48 | 2 | $O_{\{48,2,2\}}$ |
| 5 | 1 | 96 | 1 | $O_{\{96,1,1\}}$ |
| 6 | 1 | 96 | 2 | $O_{\{96,1,1\}}$ |
| 7 | 3 | 24 | 2 | $P_{\{24,2,1\}}$ |
| 8 | 3 | 24 | 2 | $P_{\{24,2,2\}}$ |
| 9 | 3 | 48 | 2 | $P_{\{48,2,1\}}$ |
| 10 | 3 | 48 | 2 | $P_{\{48,2,2\}}$ |
| 11 | Reserved | | | |
| 12 | Reserved | | | |
| 13 | Reserved | | | |
| 14 | Reserved | | | |
| 15 | Reserved | | | |

TABLE 15-3

Example enhancement to CORESET#0 configuration when
{SS/PBCH block, PDCCH} SCS is {120, 120} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,1,1\}}$ |
| 1 | 1 | 48 | 1 | $O_{\{48,2,1\}}$ |
| 2 | 1 | 48 | 1 | $O_{\{48,2,2\}}$ |
| 3 | 1 | 48 | 2 | $O_{\{48,2,1\}}$ |
| 4 | 1 | 48 | 2 | $O_{\{48,2,2\}}$ |
| 5 | 1 | 96 | 1 | $O_{\{96,2,1\}}$ |
| 6 | 1 | 96 | 1 | $O_{\{96,2,2\}}$ |
| 7 | 1 | 96 | 2 | $P_{\{96,2,1\}}$ |
| 8 | 1 | 96 | 2 | $P_{\{96,2,2\}}$ |
| 9 | 3 | 24 | 2 | $P_{\{48,2,1\}}$ |
| 10 | 3 | 24 | 2 | $P_{\{48,2,2\}}$ |
| 11 | 3 | 48 | 2 | $P_{\{48,2,1\}}$ |
| 12 | 3 | 48 | 2 | $P_{\{48,2,2\}}$ |
| 13 | Reserved | | | |
| 14 | Reserved | | | |
| 15 | Reserved | | | |

TABLE 15-4

Example enhancement to CORESET#0 configuration when
{SS/PBCH block, PDCCH} SCS is {120, 120} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,2,1\}}$ |
| 1 | 1 | 24 | 2 | $O_{\{24,2,2\}}$ |
| 2 | 1 | 48 | 1 | $O_{\{48,2,1\}}$ |
| 3 | 1 | 48 | 2 | $O_{\{48,2,2\}}$ |
| 4 | 1 | 48 | 2 | $O_{\{48,2,1\}}$ |
| 5 | 1 | 48 | 2 | $O_{\{48,2,2\}}$ |
| 6 | 1 | 96 | 1 | $O_{\{96,1,1\}}$ |
| 7 | 1 | 96 | 2 | $O_{\{96,1,1\}}$ |

TABLE 15-4-continued

Example enhancement to CORESET#0 configuration when {SS/PBCH block, PDCCH} SCS is {120, 120} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 8 | 3 | 24 | 2 | $P_{\{24,2,1\}}$ |
| 9 | 3 | 24 | 2 | $P_{\{24,2,2\}}$ |
| 10 | 3 | 48 | 2 | $P_{\{48,2,1\}}$ |
| 11 | 3 | 48 | 2 | $P_{\{48,2,2\}}$ |
| 12 | Reserved | | | |
| 13 | Reserved | | | |
| 14 | Reserved | | | |
| 15 | Reserved | | | |

TABLE 15-5

Example enhancement to CORESET#0 configuration when {SS/PBCH block, PDCCH} SCS is {120, 120} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,2,1\}}$ |
| 1 | 1 | 24 | 2 | $O_{\{24,2,2\}}$ |
| 2 | 1 | 48 | 1 | $O_{\{48,2,1\}}$ |
| 3 | 1 | 48 | 1 | $O_{\{48,2,2\}}$ |
| 4 | 1 | 48 | 2 | $O_{\{48,2,1\}}$ |
| 5 | 1 | 48 | 2 | $O_{\{48,2,2\}}$ |
| 6 | 1 | 96 | 1 | $O_{\{96,2,1\}}$ |
| 7 | 1 | 96 | 1 | $O_{\{96,2,2\}}$ |
| 8 | 1 | 96 | 2 | $O_{\{96,2,1\}}$ |
| 9 | 1 | 96 | 2 | $O_{\{96,2,2\}}$ |
| 10 | 3 | 24 | 2 | $P_{\{24,2,1\}}$ |
| 11 | 3 | 24 | 2 | $P_{\{24,2,2\}}$ |
| 12 | 3 | 48 | 2 | $P_{\{48,2,1\}}$ |
| 13 | 3 | 48 | 2 | $P_{\{48,2,2\}}$ |
| 14 | Reserved | | | |
| 15 | Reserved | | | |

TABLE 15-6

Example enhancement to CORESET#0 configuration when {SS/PBCH block, PDCCH} SCS is {120, 120} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,2,1\}}$ |
| 1 | 1 | 24 | 2 | $O_{\{24,2,2\}}$ |
| 2 | 1 | 48 | 1 | $O_{\{48,3,1\}}$ |
| 3 | 1 | 48 | 1 | $O_{\{48,3,2\}}$ |
| 4 | 1 | 48 | 1 | $O_{\{48,3,3\}}$ |
| 5 | 1 | 48 | 2 | $O_{\{48,3,1\}}$ |
| 6 | 1 | 48 | 2 | $O_{\{48,3,2\}}$ |
| 7 | 1 | 48 | 2 | $O_{\{48,3,3\}}$ |
| 8 | 1 | 96 | 1 | $O_{\{96,1,1\}}$ |
| 9 | 1 | 96 | 2 | $O_{\{96,1,1\}}$ |
| 10 | 3 | 24 | 2 | $P_{\{24,2,1\}}$ |
| 11 | 3 | 24 | 2 | $P_{\{24,2,2\}}$ |
| 12 | 3 | 48 | 2 | $P_{\{48,2,1\}}$ |
| 13 | 3 | 48 | 2 | $P_{\{48,2,2\}}$ |
| 14 | Reserved | | | |
| 15 | Reserved | | | |

TABLE 15-7

Example enhancement to CORESET#0 configuration when {SS/PBCH block, PDCCH} SCS is {120, 120} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,2,1\}}$ |
| 1 | 1 | 24 | 2 | $O_{\{24,2,2\}}$ |
| 2 | 1 | 48 | 1 | $O_{\{48,3,1\}}$ |
| 3 | 1 | 48 | 1 | $O_{\{48,3,2\}}$ |
| 4 | 1 | 48 | 1 | $O_{\{48,3,3\}}$ |
| 5 | 1 | 48 | 2 | $O_{\{48,3,1\}}$ |
| 6 | 1 | 48 | 2 | $O_{\{48,3,2\}}$ |
| 7 | 1 | 48 | 2 | $O_{\{48,3,3\}}$ |
| 8 | 1 | 96 | 1 | $O_{\{96,2,1\}}$ |
| 9 | 1 | 96 | 1 | $O_{\{96,2,2\}}$ |
| 10 | 1 | 96 | 2 | $O_{\{96,2,1\}}$ |
| 11 | 1 | 96 | 2 | $O_{\{96,2,2\}}$ |
| 12 | 3 | 24 | 2 | $P_{\{24,2,1\}}$ |
| 13 | 3 | 24 | 2 | $P_{\{24,2,2\}}$ |
| 14 | 3 | 48 | 2 | $P_{\{48,2,1\}}$ |
| 15 | 3 | 48 | 2 | $P_{\{48,2,2\}}$ |

TABLE 15-8

Example enhancement to CORESET#0 configuration when {SS/PBCH block, PDCCH} SCS is {120, 120} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,2,1\}}$ |
| 1 | 1 | 24 | 2 | $O_{\{24,2,2\}}$ |
| 2 | 1 | 48 | 1 | $O_{\{48,1,1\}}$ |
| 3 | 1 | 48 | 2 | $O_{\{48,1,1\}}$ |
| 4 | 1 | 96 | 1 | $O_{\{96,2,1\}}$ |
| 5 | 1 | 96 | 1 | $O_{\{96,2,2\}}$ |
| 6 | 1 | 96 | 2 | $O_{\{96,2,1\}}$ |
| 7 | 1 | 96 | 2 | $O_{\{96,2,2\}}$ |
| 8 | 3 | 24 | 2 | $P_{\{24,2,1\}}$ |
| 9 | 3 | 24 | 2 | $P_{\{24,2,2\}}$ |
| 10 | 3 | 48 | 2 | $P_{\{48,2,1\}}$ |
| 11 | 3 | 48 | 2 | $P_{\{48,2,2\}}$ |
| 12 | Reserved | | | |
| 13 | Reserved | | | |
| 14 | Reserved | | | |
| 15 | Reserved | | | |

In one embodiment, for a higher frequency range (e.g., 52.6 to 71 GHz), at least one of the default SCS of SS/PBCH block for initial access can be 480 kHz and the SCS of the associated Type0-PDCCH in the CORESET #0 can also be 480 kHz, then a CORESET #0 configuration table is needed for such combination.

In one example, the configuration table for {SS/PBCH block, CORESET #0} SCS={480,480} kHz can be the same as the configuration table for {SS/PBCH block, PDCCH in CORESET #0} SCS={120,120} kHz.

In one example, if the minimum channel bandwidth is 50 or 100 or 200 MHz, at least part or all of the following CORESET #0 configurations for Pattern 1 in TABLE 16-1 can be supported, wherein $N_{symbol}^{CORESET\ \#0}$ is the number of symbol for CORESET #0, and the number of offsets for a given CORESET #0 bandwidth follows the minimum required number as in TABLE 9-1. In one further example, if the UE bandwidth for initial cell search is limit to 400 MHz, then only configurations with $N_{RB}^{CORESET\ \#0}$=24 or 48 RB are applicable. In another further example, if the UE bandwidth for initial cell search is limit to 200 MHz, then only configurations with $N_{RB}^{CORESET\ \#0}=24$ RB are applicable.

TABLE 16-1

Example CORESET#0 configuration when {SS/PBCH block, PDCCH} SCS is {480, 480} kHz.

| Index | SSB and CORESET #0 multiplexing pattern | $N_{RB}^{CORESET\#0}$ | $N_{symbol}^{CORESET\#0}$ | Offset (RB) |
|---|---|---|---|---|
| — | 1 | 24 | 2 | 0 |
| — | 1 | 24 | 2 | 4 |
| — | 1 | 48 | 1 | 14 |
| — | 1 | 48 | 2 | 14 |
| — | 1 | 96 | 1 | 38 |
| — | 1 | 96 | 2 | 38 |

In another example, if the minimum channel bandwidth is 400 MHz, at least part or all of the following CORESET #0 configurations for Pattern 1 in TABLE 16-2 (e.g., for step size of GSCN for sync raster entries as 15) or TABLE 16-3 (e.g., for step size of GSCN for sync raster entries as 8) can be supported, wherein $N_{symbol}^{CORESET\ \#0}$ is the number of symbol for CORESET #0, and the number of offsets for a given CORESET #0 bandwidth follows the minimum required number as in TABLE 9-2. In one further example, if the UE bandwidth for initial cell search is limit to 400 MHz, then only configurations with $N_{RB}^{CORESET\ \#0}=24$ or 48 RB are applicable. In another further example, if the UE bandwidth for initial cell search is limit to 200 MHz, then only configurations with $N_{RB}^{CORESET\ \#0}=24$ RB are applicable.

TABLE 16-2

Example CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| — | 1 | 24 | 2 | 0 |
| — | 1 | 24 | 2 | 4 |
| — | 1 | 48 | 1 | 0 |
| — | 1 | 48 | 1 | 14 |
| — | 1 | 48 | 1 | 28 |
| — | 1 | 48 | 2 | 0 |
| — | 1 | 48 | 2 | 14 |
| — | 1 | 48 | 2 | 28 |
| — | 1 | 96 | 1 | 0 |
| — | 1 | 96 | 1 | 76 |
| — | 1 | 96 | 2 | 0 |
| — | 1 | 96 | 2 | 76 |

TABLE 16-3

Example CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| — | 1 | 24 | 2 | 2 |
| — | 1 | 48 | 1 | 0 |

TABLE 16-3-continued

Example CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| — | 1 | 48 | 1 | 28 |
| — | 1 | 48 | 2 | 0 |
| — | 1 | 48 | 2 | 28 |
| — | 1 | 96 | 1 | 38 |
| — | 1 | 96 | 2 | 38 |

In yet another example, if the minimum channel bandwidth is 800 MHz, at least part or all of the following CORESET #0 configurations for Pattern 1 in TABLE 16-4 can be supported, wherein $N_{symbol}^{CORESET\ \#0}$ is the number of symbol for CORESET #0, and the number of offsets for a given CORESET #0 bandwidth follows the minimum required number as in TABLE 9-3. In one further example, if the UE bandwidth for initial cell search is limit to 400 MHz, then only configurations with $N_{RB}^{CORESET\ \#0}=24$ or 48 RB are applicable. In another further example, if the UE bandwidth for initial cell search is limit to 200 MHz, then only configurations with $N_{RB}^{CORESET\ \#0}=24$ RB are applicable.

TABLE 16-4

Example CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| — | 1 | 24 | 2 | 0 |
| — | 1 | 24 | 2 | 4 |
| — | 1 | 48 | 1 | 0 |
| — | 1 | 48 | 1 | 28 |
| — | 1 | 48 | 2 | 0 |
| — | 1 | 48 | 2 | 28 |
| — | 1 | 96 | 1 | 0 |
| — | 1 | 96 | 1 | 38 |
| — | 1 | 96 | 1 | 76 |
| — | 1 | 96 | 2 | 0 |
| — | 1 | 96 | 2 | 38 |
| — | 1 | 96 | 2 | 76 |

In yet another example, at least part or all of the following CORESET #0 configurations for Pattern 1 in TALE 16-5 can be supported, wherein $N_{symbol}^{CORESET\ \#0}$ is the number of symbol for CORESET #0, and the number of offsets for a given CORESET #0 bandwidth follows the actual configurable number as in TABLE 11. In one further example, if the UE bandwidth for initial cell search is limit to 400 MHz, then only configurations with $N_{RB}^{CORESET\ \#0}=24$ or 48 RB are applicable. In another further example, if the UE bandwidth for initial cell search is limit to 200 MHz, then only configurations with $N_{RB}^{CORESET\ \#0}=24$ RB are applicable.

TABLE 16-5

Example CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| — | 1 | 24 | 2 | 0 |
| — | 1 | 24 | 2 | 2 |
| — | 1 | 24 | 2 | 4 |
| — | 1 | 48 | 1 | 0 |
| — | 1 | 48 | 1 | 14 |
| — | 1 | 48 | 1 | 28 |
| — | 1 | 48 | 2 | 0 |
| — | 1 | 48 | 2 | 14 |
| — | 1 | 48 | 2 | 28 |
| — | 1 | 96 | 1 | 0 |
| — | 1 | 96 | 1 | 38 |
| — | 1 | 96 | 1 | 76 |
| — | 1 | 96 | 2 | 0 |
| — | 1 | 96 | 2 | 38 |
| — | 1 | 96 | 2 | 76 |

In one example, example CORESET #0 configuration table when {SS/PBCH block, PDCCH} SCS is {480, 480} kHz is given by TABLE 16-6 to TABLE 16-29, wherein the offset values $O_{\{*,*,*\}}$ is given by TABLE 11, and offset values $P_{\{*,*,*\}}$ can be given by the following sub-example: for one sub-example, $P_{\{24,2,1\}}=P_{\{48,2,1\}}=-20$ if $k_{SSB}=0$; $P_{\{24,2,1\}}=P_{\{48,2,1\}}=-21$ if $k_{SSB}>0$; and $P_{\{24,2,2\}}=24$, $P_{\{48,2,2\}}=48$.

TABLE 16-6

Example enhancement to CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,2,1\}}$ |
| 1 | 1 | 24 | 2 | $O_{\{24,2,2\}}$ |
| 2 | 1 | 48 | 1 | $O_{\{48,3,1\}}$ |
| 3 | 1 | 48 | 1 | $O_{\{48,3,2\}}$ |
| 4 | 1 | 48 | 1 | $O_{\{48,3,3\}}$ |
| 5 | 1 | 48 | 2 | $O_{\{48,3,1\}}$ |
| 6 | 1 | 48 | 2 | $O_{\{48,3,2\}}$ |
| 7 | 1 | 48 | 2 | $O_{\{48,3,3\}}$ |
| 8 | 3 | 24 | 2 | $P_{\{24,2,1\}}$ |
| 9 | 3 | 24 | 2 | $P_{\{24,2,2\}}$ |
| 10 | 3 | 48 | 2 | $P_{\{48,2,1\}}$ |
| 11 | 3 | 48 | 2 | $P_{\{48,2,2\}}$ |
| 12 | Reserved | | | |
| 13 | Reserved | | | |
| 14 | Reserved | | | |
| 15 | Reserved | | | |

TABLE 16-7

Example enhancement to CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,1,1\}}$ |
| 1 | 1 | 48 | 1 | $O_{\{48,2,1\}}$ |
| 2 | 1 | 48 | 1 | $O_{\{48,2,2\}}$ |
| 3 | 1 | 48 | 2 | $O_{\{48,2,1\}}$ |
| 4 | 1 | 48 | 2 | $O_{\{48,2,2\}}$ |
| 5 | 3 | 24 | 2 | $P_{\{24,2,1\}}$ |
| 6 | 3 | 24 | 2 | $P_{\{24,2,2\}}$ |
| 7 | 3 | 48 | 2 | $P_{\{48,2,1\}}$ |
| 8 | 3 | 48 | 2 | $P_{\{48,2,2\}}$ |
| 9 | Reserved | | | |
| 10 | Reserved | | | |
| 11 | Reserved | | | |
| 12 | Reserved | | | |
| 13 | Reserved | | | |
| 14 | Reserved | | | |
| 15 | Reserved | | | |

TABLE 16-8

Example enhancement to CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,1,1\}}$ |
| 1 | 1 | 48 | 1 | $O_{\{48,3,1\}}$ |
| 2 | 1 | 48 | 1 | $O_{\{48,3,2\}}$ |
| 3 | 1 | 48 | 1 | $O_{\{48,3,3\}}$ |
| 4 | 1 | 48 | 2 | $O_{\{48,3,1\}}$ |
| 5 | 1 | 48 | 2 | $O_{\{48,3,2\}}$ |
| 6 | 1 | 48 | 2 | $O_{\{48,3,3\}}$ |
| 7 | 3 | 24 | 2 | $P_{\{24,2,1\}}$ |
| 8 | 3 | 24 | 2 | $P_{\{24,2,2\}}$ |
| 9 | 3 | 48 | 2 | $P_{\{48,2,1\}}$ |
| 10 | 3 | 48 | 2 | $P_{\{48,2,2\}}$ |
| 11 | Reserved | | | |
| 12 | Reserved | | | |
| 13 | Reserved | | | |
| 14 | Reserved | | | |
| 15 | Reserved | | | |

TABLE 16-9

Example enhancement to CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,2,1\}}$ |
| 1 | 1 | 24 | 2 | $O_{\{24,2,2\}}$ |
| 2 | 1 | 48 | 1 | $O_{\{48,2,1\}}$ |
| 3 | 1 | 48 | 1 | $O_{\{48,2,2\}}$ |
| 4 | 1 | 48 | 2 | $O_{\{48,2,1\}}$ |
| 5 | 1 | 48 | 2 | $O_{\{48,2,2\}}$ |
| 6 | 3 | 24 | 2 | $P_{\{24,2,1\}}$ |
| 7 | 3 | 24 | 2 | $P_{\{24,2,2\}}$ |
| 8 | 3 | 48 | 2 | $P_{\{48,2,1\}}$ |
| 9 | 3 | 48 | 2 | $P_{\{48,2,2\}}$ |
| 10 | Reserved | | | |
| 11 | Reserved | | | |
| 12 | Reserved | | | |
| 13 | Reserved | | | |
| 14 | Reserved | | | |
| 15 | Reserved | | | |

TABLE 16-10

Example enhancement to CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,3,1\}}$ |
| 1 | 1 | 24 | 2 | $O_{\{24,3,2\}}$ |
| 2 | 1 | 24 | 2 | $O_{\{24,3,3\}}$ |
| 3 | 1 | 48 | 1 | $O_{\{48,3,1\}}$ |
| 4 | 1 | 48 | 1 | $O_{\{48,3,2\}}$ |
| 5 | 1 | 48 | 1 | $O_{\{48,3,3\}}$ |
| 6 | 1 | 48 | 2 | $O_{\{48,3,1\}}$ |
| 7 | 1 | 48 | 2 | $O_{\{48,3,2\}}$ |
| 8 | 1 | 48 | 2 | $O_{\{48,3,3\}}$ |
| 9 | 3 | 24 | 2 | $P_{\{24,2,1\}}$ |
| 10 | 3 | 24 | 2 | $P_{\{24,2,2\}}$ |
| 11 | 3 | 48 | 2 | $P_{\{48,2,1\}}$ |
| 12 | 3 | 48 | 2 | $P_{\{48,2,2\}}$ |
| 13 | Reserved | | | |
| 14 | Reserved | | | |
| 15 | Reserved | | | |

TABLE 16-11

Example enhancement to CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,2,1\}}$ |
| 1 | 1 | 24 | 2 | $O_{\{24,2,2\}}$ |
| 2 | 1 | 48 | 1 | $O_{\{48,3,1\}}$ |
| 3 | 1 | 48 | 1 | $O_{\{48,3,2\}}$ |
| 4 | 1 | 48 | 1 | $O_{\{48,3,3\}}$ |
| 5 | 1 | 48 | 2 | $O_{\{48,3,1\}}$ |
| 6 | 1 | 48 | 2 | $O_{\{48,3,2\}}$ |
| 7 | 1 | 48 | 2 | $O_{\{48,3,3\}}$ |
| 8 | 3 | 24 | 2 | $P_{\{24,2,1\}}$ |
| 9 | 3 | 24 | 2 | $P_{\{24,2,2\}}$ |
| 10 | 3 | 48 | 2 | $P_{\{48,2,1\}}$ |
| 11 | 3 | 48 | 2 | $P_{\{48,2,2\}}$ |
| 12 | 1 | 96 | 2 | $O_{\{96,1,1\}}$ |
| 13 | Reserved | | | |
| 14 | Reserved | | | |
| 15 | Reserved | | | |

TABLE 16-12

Example enhancement to CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,2,1\}}$ |
| 1 | 1 | 24 | 2 | $O_{\{24,2,2\}}$ |
| 2 | 1 | 48 | 1 | $O_{\{48,3,1\}}$ |
| 3 | 1 | 48 | 1 | $O_{\{48,3,2\}}$ |
| 4 | 1 | 48 | 1 | $O_{\{48,3,3\}}$ |
| 5 | 1 | 48 | 2 | $O_{\{48,3,1\}}$ |
| 6 | 1 | 48 | 2 | $O_{\{48,3,2\}}$ |
| 7 | 1 | 48 | 2 | $O_{\{48,3,3\}}$ |
| 8 | 3 | 24 | 2 | $P_{\{24,2,1\}}$ |
| 9 | 3 | 24 | 2 | $P_{\{24,2,2\}}$ |
| 10 | 3 | 48 | 2 | $P_{\{48,2,1\}}$ |
| 11 | 3 | 48 | 2 | $P_{\{48,2,2\}}$ |
| 12 | 1 | 96 | 2 | $O_{\{96,2,1\}}$ |
| 13 | 1 | 96 | 2 | $O_{\{96,2,2\}}$ |
| 14 | Reserved | | | |
| 15 | Reserved | | | |

TABLE 16-13

Example enhancement to CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,2,1\}}$ |
| 1 | 1 | 24 | 2 | $O_{\{24,2,2\}}$ |
| 2 | 1 | 48 | 1 | $O_{\{48,3,1\}}$ |
| 3 | 1 | 48 | 1 | $O_{\{48,3,2\}}$ |
| 4 | 1 | 48 | 1 | $O_{\{48,3,3\}}$ |
| 5 | 1 | 48 | 2 | $O_{\{48,3,1\}}$ |
| 6 | 1 | 48 | 2 | $O_{\{48,3,2\}}$ |
| 7 | 1 | 48 | 2 | $O_{\{48,3,3\}}$ |
| 8 | 3 | 24 | 2 | $P_{\{24,2,1\}}$ |
| 9 | 3 | 24 | 2 | $P_{\{24,2,2\}}$ |
| 10 | 3 | 48 | 2 | $P_{\{48,2,1\}}$ |
| 11 | 3 | 48 | 2 | $P_{\{48,2,2\}}$ |
| 12 | 1 | 96 | 1 | $O_{\{96,1,1\}}$ |
| 13 | 1 | 96 | 2 | $O_{\{96,1,1\}}$ |
| 14 | Reserved | | | |
| 15 | Reserved | | | |

TABLE 16-14

Example enhancement to CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,2,1\}}$ |
| 1 | 1 | 24 | 2 | $O_{\{24,2,2\}}$ |
| 2 | 1 | 48 | 1 | $O_{\{48,3,1\}}$ |
| 3 | 1 | 48 | 1 | $O_{\{48,3,2\}}$ |
| 4 | 1 | 48 | 1 | $O_{\{48,3,3\}}$ |
| 5 | 1 | 48 | 2 | $O_{\{48,3,1\}}$ |
| 6 | 1 | 48 | 2 | $O_{\{48,3,2\}}$ |
| 7 | 1 | 48 | 2 | $O_{\{48,3,3\}}$ |
| 8 | 3 | 24 | 2 | $P_{\{24,2,1\}}$ |
| 9 | 3 | 24 | 2 | $P_{\{24,2,2\}}$ |
| 10 | 3 | 48 | 2 | $P_{\{48,2,1\}}$ |
| 11 | 3 | 48 | 2 | $P_{\{48,2,2\}}$ |
| 12 | 1 | 96 | 1 | $O_{\{96,2,1\}}$ |
| 13 | 1 | 96 | 1 | $O_{\{96,2,2\}}$ |
| 14 | 1 | 96 | 2 | $O_{\{96,2,1\}}$ |
| 15 | 1 | 96 | 2 | $O_{\{96,2,2\}}$ |

TABLE 16-15

Example enhancement to CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,1,1\}}$ |
| 1 | 1 | 48 | 1 | $O_{\{48,2,1\}}$ |
| 2 | 1 | 48 | 1 | $O_{\{48,2,2\}}$ |
| 3 | 1 | 48 | 2 | $O_{\{48,2,1\}}$ |
| 4 | 1 | 48 | 2 | $O_{\{48,2,2\}}$ |
| 5 | 3 | 24 | 2 | $P_{\{24,2,1\}}$ |
| 6 | 3 | 24 | 2 | $P_{\{24,2,2\}}$ |
| 7 | 3 | 48 | 2 | $P_{\{48,2,1\}}$ |
| 8 | 3 | 48 | 2 | $P_{\{48,2,2\}}$ |
| 9 | 1 | 96 | 2 | $O_{\{96,1,1\}}$ |
| 10 | Reserved | | | |
| 11 | Reserved | | | |
| 12 | Reserved | | | |
| 13 | Reserved | | | |
| 14 | Reserved | | | |
| 15 | Reserved | | | |

TABLE 16-16

Example enhancement to CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,1,1\}}$ |
| 1 | 1 | 48 | 1 | $O_{\{48,2,1\}}$ |
| 2 | 1 | 48 | 1 | $O_{\{48,2,2\}}$ |
| 3 | 1 | 48 | 2 | $O_{\{48,2,1\}}$ |
| 4 | 1 | 48 | 2 | $O_{\{48,2,2\}}$ |
| 5 | 3 | 24 | 2 | $P_{\{24,2,1\}}$ |
| 6 | 3 | 24 | 2 | $P_{\{24,2,2\}}$ |
| 7 | 3 | 48 | 2 | $P_{\{48,2,1\}}$ |
| 8 | 3 | 48 | 2 | $P_{\{48,2,2\}}$ |
| 9 | 1 | 96 | 2 | $O_{\{96,2,1\}}$ |
| 10 | 1 | 96 | 2 | $O_{\{96,2,2\}}$ |
| 11 | Reserved | | | |
| 12 | Reserved | | | |
| 13 | Reserved | | | |
| 14 | Reserved | | | |
| 15 | Reserved | | | |

TABLE 16-17

Example enhancement to CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,1,1\}}$ |
| 1 | 1 | 48 | 1 | $O_{\{48,2,1\}}$ |
| 2 | 1 | 48 | 1 | $O_{\{48,2,2\}}$ |
| 3 | 1 | 48 | 2 | $O_{\{48,2,1\}}$ |
| 4 | 1 | 48 | 2 | $O_{\{48,2,2\}}$ |
| 5 | 3 | 24 | 2 | $P_{\{24,2,1\}}$ |
| 6 | 3 | 24 | 2 | $P_{\{24,2,2\}}$ |
| 7 | 3 | 48 | 2 | $P_{\{48,2,1\}}$ |
| 8 | 3 | 48 | 2 | $P_{\{48,2,2\}}$ |
| 9 | 1 | 96 | 1 | $O_{\{96,1,1\}}$ |
| 10 | 1 | 96 | 2 | $O_{\{96,1,1\}}$ |
| 11 | Reserved | | | |
| 12 | Reserved | | | |
| 13 | Reserved | | | |
| 14 | Reserved | | | |
| 15 | Reserved | | | |

TABLE 16-18

Example enhancement to CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,1,1\}}$ |
| 1 | 1 | 48 | 1 | $O_{\{48,2,1\}}$ |
| 2 | 1 | 48 | 1 | $O_{\{48,2,2\}}$ |
| 3 | 1 | 48 | 2 | $O_{\{48,2,1\}}$ |
| 4 | 1 | 48 | 2 | $O_{\{48,2,2\}}$ |
| 5 | 3 | 24 | 2 | $P_{\{24,2,1\}}$ |
| 6 | 3 | 24 | 2 | $P_{\{24,2,2\}}$ |
| 7 | 3 | 48 | 2 | $P_{\{48,2,1\}}$ |
| 8 | 3 | 48 | 2 | $P_{\{48,2,2\}}$ |
| 9 | 1 | 96 | 1 | $O_{\{96,2,1\}}$ |
| 10 | 1 | 96 | 1 | $O_{\{96,2,2\}}$ |
| 11 | 1 | 96 | 2 | $O_{\{96,2,1\}}$ |
| 12 | 1 | 96 | 2 | $O_{\{96,2,2\}}$ |
| 13 | Reserved | | | |
| 14 | Reserved | | | |
| 15 | Reserved | | | |

TABLE 16-19

Example enhancement to CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,1,1\}}$ |
| 1 | 1 | 48 | 1 | $O_{\{48,3,1\}}$ |
| 2 | 1 | 48 | 1 | $O_{\{48,3,2\}}$ |
| 3 | 1 | 48 | 1 | $O_{\{48,3,3\}}$ |
| 4 | 1 | 48 | 2 | $O_{\{48,3,1\}}$ |
| 5 | 1 | 48 | 2 | $O_{\{48,3,2\}}$ |
| 6 | 1 | 48 | 2 | $O_{\{48,3,3\}}$ |
| 7 | 3 | 24 | 2 | $P_{\{24,2,1\}}$ |
| 8 | 3 | 24 | 2 | $P_{\{24,2,2\}}$ |
| 9 | 3 | 48 | 2 | $P_{\{48,2,1\}}$ |
| 10 | 3 | 48 | 2 | $P_{\{48,2,2\}}$ |
| 11 | 1 | 96 | 2 | $O_{\{96,1,1\}}$ |
| 12 | Reserved | | | |
| 13 | Reserved | | | |
| 14 | Reserved | | | |
| 15 | Reserved | | | |

TABLE 16-20

Example enhancement to CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,1,1\}}$ |
| 1 | 1 | 48 | 1 | $O_{\{48,3,1\}}$ |
| 2 | 1 | 48 | 1 | $O_{\{48,3,2\}}$ |
| 3 | 1 | 48 | 1 | $O_{\{48,3,3\}}$ |
| 4 | 1 | 48 | 2 | $O_{\{48,3,1\}}$ |
| 5 | 1 | 48 | 2 | $O_{\{48,3,2\}}$ |
| 6 | 1 | 48 | 2 | $O_{\{48,3,3\}}$ |
| 7 | 3 | 24 | 2 | $P_{\{24,2,1\}}$ |
| 8 | 3 | 24 | 2 | $P_{\{24,2,2\}}$ |
| 9 | 3 | 48 | 2 | $P_{\{48,2,1\}}$ |
| 10 | 3 | 48 | 2 | $P_{\{48,2,2\}}$ |
| 11 | 1 | 96 | 2 | $O_{\{96,2,1\}}$ |
| 12 | 1 | 96 | 2 | $O_{\{96,2,2\}}$ |
| 13 | Reserved | | | |
| 14 | Reserved | | | |
| 15 | Reserved | | | |

TABLE 16-21

Example enhancement to CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,1,1\}}$ |
| 1 | 1 | 48 | 1 | $O_{\{48,3,1\}}$ |
| 2 | 1 | 48 | 1 | $O_{\{48,3,2\}}$ |
| 3 | 1 | 48 | 1 | $O_{\{48,3,3\}}$ |
| 4 | 1 | 48 | 2 | $O_{\{48,3,1\}}$ |
| 5 | 1 | 48 | 2 | $O_{\{48,3,2\}}$ |
| 6 | 1 | 48 | 2 | $O_{\{48,3,3\}}$ |
| 7 | 3 | 24 | 2 | $P_{\{24,2,1\}}$ |
| 8 | 3 | 24 | 2 | $P_{\{24,2,2\}}$ |
| 9 | 3 | 48 | 2 | $P_{\{48,2,1\}}$ |
| 10 | 3 | 48 | 2 | $P_{\{48,2,2\}}$ |
| 11 | 1 | 96 | 1 | $O_{\{96,1,1\}}$ |
| 12 | 1 | 96 | 2 | $O_{\{96,1,1\}}$ |
| 13 | Reserved | | | |
| 14 | Reserved | | | |
| 15 | Reserved | | | |

TABLE 16-22

Example enhancement to CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,1,1\}}$ |
| 1 | 1 | 48 | 1 | $O_{\{48,3,1\}}$ |
| 2 | 1 | 48 | 1 | $O_{\{48,3,2\}}$ |
| 3 | 1 | 48 | 1 | $O_{\{48,3,3\}}$ |
| 4 | 1 | 48 | 2 | $O_{\{48,3,1\}}$ |
| 5 | 1 | 48 | 2 | $O_{\{48,3,2\}}$ |
| 6 | 1 | 48 | 2 | $O_{\{48,3,3\}}$ |
| 7 | 3 | 24 | 2 | $P_{\{24,2,1\}}$ |
| 8 | 3 | 24 | 2 | $P_{\{24,2,2\}}$ |
| 9 | 3 | 48 | 2 | $P_{\{48,2,1\}}$ |
| 10 | 3 | 48 | 2 | $P_{\{48,2,2\}}$ |
| 11 | 1 | 96 | 1 | $O_{\{96,2,1\}}$ |
| 12 | 1 | 96 | 1 | $O_{\{96,2,2\}}$ |
| 13 | 1 | 96 | 2 | $O_{\{96,2,1\}}$ |
| 14 | 1 | 96 | 2 | $O_{\{96,2,2\}}$ |
| 15 | Reserved | | | |

TABLE 16-23

Example enhancement to CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,2,1\}}$ |
| 1 | 1 | 24 | 2 | $O_{\{24,2,2\}}$ |
| 2 | 1 | 48 | 1 | $O_{\{48,2,1\}}$ |
| 3 | 1 | 48 | 1 | $O_{\{48,2,2\}}$ |
| 4 | 1 | 48 | 2 | $O_{\{48,2,1\}}$ |
| 5 | 1 | 48 | 2 | $O_{\{48,2,2\}}$ |
| 6 | 3 | 24 | 2 | $P_{\{24,2,1\}}$ |
| 7 | 3 | 24 | 2 | $P_{\{24,2,2\}}$ |
| 8 | 3 | 48 | 2 | $P_{\{48,2,1\}}$ |
| 9 | 3 | 48 | 2 | $P_{\{48,2,2\}}$ |
| 10 | 1 | 96 | 2 | $O_{\{96,1,1\}}$ |
| 11 | Reserved | | | |
| 12 | Reserved | | | |
| 13 | Reserved | | | |
| 14 | Reserved | | | |
| 15 | Reserved | | | |

TABLE 16-24

Example enhancement to CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,2,1\}}$ |
| 1 | 1 | 24 | 2 | $O_{\{24,2,2\}}$ |
| 2 | 1 | 48 | 1 | $O_{\{48,2,1\}}$ |
| 3 | 1 | 48 | 1 | $O_{\{48,2,2\}}$ |
| 4 | 1 | 48 | 2 | $O_{\{48,2,1\}}$ |
| 5 | 1 | 48 | 2 | $O_{\{48,2,2\}}$ |
| 6 | 3 | 24 | 2 | $P_{\{24,2,1\}}$ |
| 7 | 3 | 24 | 2 | $P_{\{24,2,2\}}$ |
| 8 | 3 | 48 | 2 | $P_{\{48,2,1\}}$ |
| 9 | 3 | 48 | 2 | $P_{\{48,2,2\}}$ |
| 10 | 1 | 96 | 2 | $O_{\{96,2,1\}}$ |
| 11 | 1 | 96 | 2 | $O_{\{96,2,2\}}$ |
| 12 | Reserved | | | |
| 13 | Reserved | | | |
| 14 | Reserved | | | |
| 15 | Reserved | | | |

TABLE 16-25

Example enhancement to CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,2,1\}}$ |
| 1 | 1 | 24 | 2 | $O_{\{24,2,2\}}$ |
| 2 | 1 | 48 | 1 | $O_{\{48,2,1\}}$ |
| 3 | 1 | 48 | 1 | $O_{\{48,2,2\}}$ |
| 4 | 1 | 48 | 2 | $O_{\{48,2,1\}}$ |
| 5 | 1 | 48 | 2 | $O_{\{48,2,2\}}$ |
| 6 | 3 | 24 | 2 | $P_{\{24,2,1\}}$ |
| 7 | 3 | 24 | 2 | $P_{\{24,2,2\}}$ |
| 8 | 3 | 48 | 2 | $P_{\{48,2,1\}}$ |
| 9 | 3 | 48 | 2 | $P_{\{48,2,2\}}$ |
| 10 | 1 | 96 | 1 | $O_{\{96,1,1\}}$ |
| 11 | 1 | 96 | 2 | $O_{\{96,1,1\}}$ |
| 12 | Reserved | | | |
| 13 | Reserved | | | |
| 14 | Reserved | | | |
| 15 | Reserved | | | |

TABLE 16-26

Example enhancement to CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,2,1\}}$ |
| 1 | 1 | 24 | 2 | $O_{\{24,2,2\}}$ |
| 2 | 1 | 48 | 1 | $O_{\{48,2,1\}}$ |
| 3 | 1 | 48 | 1 | $O_{\{48,2,2\}}$ |
| 4 | 1 | 48 | 2 | $O_{\{48,2,1\}}$ |
| 5 | 1 | 48 | 2 | $O_{\{48,2,2\}}$ |
| 6 | 3 | 24 | 2 | $P_{\{24,2,1\}}$ |
| 7 | 3 | 24 | 2 | $P_{\{24,2,2\}}$ |
| 8 | 3 | 48 | 2 | $P_{\{48,2,1\}}$ |
| 9 | 3 | 48 | 2 | $P_{\{48,2,2\}}$ |
| 10 | 1 | 96 | 1 | $O_{\{96,2,1\}}$ |
| 11 | 1 | 96 | 1 | $O_{\{96,2,2\}}$ |
| 12 | 1 | 96 | 2 | $O_{\{96,2,1\}}$ |
| 13 | 1 | 96 | 2 | $O_{\{96,2,2\}}$ |
| 14 | Reserved | | | |
| 15 | Reserved | | | |

TABLE 16-27

Example enhancement to CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,3,1\}}$ |
| 1 | 1 | 24 | 2 | $O_{\{24,3,2\}}$ |
| 2 | 1 | 24 | 2 | $O_{\{24,3,3\}}$ |
| 3 | 1 | 48 | 1 | $O_{\{48,3,1\}}$ |
| 4 | 1 | 48 | 1 | $O_{\{48,3,2\}}$ |
| 5 | 1 | 48 | 1 | $O_{\{48,3,3\}}$ |
| 6 | 1 | 48 | 2 | $O_{\{48,3,1\}}$ |
| 7 | 1 | 48 | 2 | $O_{\{48,3,2\}}$ |
| 8 | 1 | 48 | 2 | $O_{\{48,3,3\}}$ |
| 9 | 3 | 24 | 2 | $P_{\{24,2,1\}}$ |
| 10 | 3 | 24 | 2 | $P_{\{24,2,2\}}$ |
| 11 | 3 | 48 | 2 | $P_{\{48,2,1\}}$ |
| 12 | 3 | 48 | 2 | $P_{\{48,2,2\}}$ |
| 13 | 1 | 96 | 2 | $O_{\{96,1,1\}}$ |
| 14 | Reserved | | | |
| 15 | Reserved | | | |

TABLE 16-28

Example enhancement to CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,3,1\}}$ |
| 1 | 1 | 24 | 2 | $O_{\{24,3,2\}}$ |
| 2 | 1 | 24 | 2 | $O_{\{24,3,3\}}$ |
| 3 | 1 | 48 | 1 | $O_{\{48,3,1\}}$ |
| 4 | 1 | 48 | 1 | $O_{\{48,3,2\}}$ |
| 5 | 1 | 48 | 1 | $O_{\{48,3,3\}}$ |
| 6 | 1 | 48 | 2 | $O_{\{48,3,1\}}$ |
| 7 | 1 | 48 | 2 | $O_{\{48,3,2\}}$ |
| 8 | 1 | 48 | 2 | $O_{\{48,3,3\}}$ |
| 9 | 3 | 24 | 2 | $P_{\{24,2,1\}}$ |
| 10 | 3 | 24 | 2 | $P_{\{24,2,2\}}$ |
| 11 | 3 | 48 | 2 | $P_{\{48,2,1\}}$ |
| 12 | 3 | 48 | 2 | $P_{\{48,2,2\}}$ |
| 13 | 1 | 96 | 1 | $O_{\{96,1,1\}}$ |
| 14 | 1 | 96 | 2 | $O_{\{96,1,1\}}$ |
| 15 | Reserved | | | |

TABLE 16-29

Example enhancement to CORESET#0 configuration when {SS/PBCH block, PDCCH} SCS is {480, 480} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| 0 | 1 | 24 | 2 | $O_{\{24,3,1\}}$ |
| 1 | 1 | 24 | 2 | $O_{\{24,3,2\}}$ |
| 2 | 1 | 24 | 2 | $O_{\{24,3,3\}}$ |
| 3 | 1 | 48 | 1 | $O_{\{48,3,1\}}$ |
| 4 | 1 | 48 | 1 | $O_{\{48,3,2\}}$ |
| 5 | 1 | 48 | 1 | $O_{\{48,3,3\}}$ |
| 6 | 1 | 48 | 2 | $O_{\{48,3,1\}}$ |
| 7 | 1 | 48 | 2 | $O_{\{48,3,2\}}$ |
| 8 | 1 | 48 | 2 | $O_{\{48,3,3\}}$ |
| 9 | 3 | 24 | 2 | $P_{\{24,2,1\}}$ |
| 10 | 3 | 24 | 2 | $P_{\{24,2,2\}}$ |
| 11 | 3 | 48 | 2 | $P_{\{48,2,1\}}$ |
| 12 | 3 | 48 | 2 | $P_{\{48,2,2\}}$ |
| 13 | 1 | 96 | 2 | $O_{\{96,2,1\}}$ |
| 14 | 1 | 96 | 2 | $O_{\{96,2,2\}}$ |
| 15 | Reserved | | | |

In one embodiment, for a higher frequency range (e.g., 52.6 to 71 GHz), the SCS of SS/PBCH block can be 960 kHz and the SCS of the associated Type0-PDCCH in the CORESET #0 can also be 960 kHz, then a CORESET #0 configuration table is needed for such combination.

In one example, the CORESET #0 configuration table for {SS/PBCH block, Type0-PDCCH in the CORESET #0} SCS as {960, 960} kHz is same as the one for {SS/PBCH block, Type0-PDCCH in the CORESET #0} SCS as {480, 480} kHz.

In another example, the CORESET #0 configuration table for {SS/PBCH block, Type0-PDCCH in the CORESET #0} SCS as {960, 960} kHz is using one of the example in TABLE 16-6 to TABLE 16-29, by replacing the {SS/PBCH block, Type0-PDCCH in the CORESET #0} SCS as {480, 480} kHz to {960, 960} kHz.

In yet another example, the CORESET #0 configuration table for {SS/PBCH block, Type0-PDCCH in the CORESET #0} SCS as {960, 960} kHz is same as the one for {SS/PBCH block, Type0-PDCCH in the CORESET #0} SCS as {120, 120} kHz.

In yet another example, the CORESET #0 configuration table for {SS/PBCH block, Type0-PDCCH in the CORESET #0} SCS as {960, 960} kHz is using one of the example in TABLE 15-2 to TABLE 15-8, by replacing the {SS/PBCH block, Type0-PDCCH in the CORESET #0} SCS as {120, 120} kHz to {960, 960} kHz.

In yet another example, if the minimum channel bandwidth is 50 or 100 or 200 or 400 MHz, at least part or all of the following CORESET #0 configurations for Pattern 1 in TABLE 17-1 can be supported, wherein $N_{symbol}^{CORESET\ \#0}$ is the number of symbol for CORESET #0, and the number of offsets for a given CORESET #0 bandwidth follows the minimum required number as in TABLE 10-1. In one further example, if the UE bandwidth for initial cell search is limit to 800 MHz, then only configurations with $N_{RB}^{CORESET\ \#0}$=24 or 48 RB are applicable. In another further example, if the UE bandwidth for initial cell search is limit to 400 MHz, then only configurations with $N_{RB}^{CORESET\ \#0}$=24 RB are applicable.

TABLE 17-1

Example CORESET#0 configuration when {SS/PBCH block, PDCCH} SCS is {960, 960} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| — | 1 | 24 | 2 | 0 |
| — | 1 | 24 | 2 | 4 |
| — | 1 | 48 | 1 | 14 |
| — | 1 | 48 | 2 | 14 |
| — | 1 | 96 | 1 | 38 |
| — | 1 | 96 | 2 | 38 |

In another example, if the minimum channel bandwidth is 800 MHz, at least part or all of the following CORESET #0 configurations for Pattern 1 in TABLE 17-2 can be supported, wherein $N_{symbol}^{CORESET\ \#0}$ is the number of symbol for CORESET #0, and the number of offsets for a given CORESET #0 bandwidth follows the minimum required number as in TABLE 10-2. In one further example, if the UE bandwidth for initial cell search is limit to 800 MHz, then only configurations with $N_{RB}^{CORESET\ \#0}$=24 or 48 RB are applicable. In another further example, if the UE bandwidth for initial cell search is limit to 400 MHz, then only configurations with $N_{RB}^{CORESET\ \#0}$=24 RB are applicable.

TABLE 17-2

Example CORESET#0 configuration when {SS/PBCH block, PDCCH} SCS is {960, 960} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| — | 1 | 24 | 2 | 0 |
| — | 1 | 24 | 2 | 4 |
| — | 1 | 48 | 1 | 0 |
| — | 1 | 48 | 1 | 14 |
| — | 1 | 48 | 1 | 28 |
| — | 1 | 48 | 2 | 0 |
| — | 1 | 48 | 2 | 14 |
| — | 1 | 48 | 2 | 28 |
| — | 1 | 96 | 1 | 0 |
| — | 1 | 96 | 1 | 76 |
| — | 1 | 96 | 2 | 0 |
| — | 1 | 96 | 2 | 76 |

In another example, at least part or all of the following CORESET #0 configurations for Pattern 1 in TABLE 17-3 can be supported, wherein $N_{symbol}^{CORESET\ \#0}$ is the number of symbol for CORESET #0, and the number of offsets for a given CORESET #0 bandwidth follows the actual configurable number as in TABLE 11. In one further example, if the UE bandwidth for initial cell search is limit to 800 MHz, then only configurations with $N_{RB}^{CORESET\ \#0}$=24 or 48 RB are applicable. In another further example, if the UE bandwidth for initial cell search is limit to 400 MHz, then only configurations with $N_{RB}^{CORESET\ \#0}$=24 RB are applicable.

TABLE 17-3

Example CORESET#0 configuration when {SS/PBCH block, PDCCH} SCS is {960, 960} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| — | 1 | 24 | 2 | 0 |
| — | 1 | 24 | 2 | 2 |
| — | 1 | 24 | 2 | 4 |
| — | 1 | 48 | 1 | 0 |
| — | 1 | 48 | 1 | 14 |
| — | 1 | 48 | 1 | 28 |
| — | 1 | 48 | 2 | 0 |
| — | 1 | 48 | 2 | 14 |
| — | 1 | 48 | 2 | 28 |
| — | 1 | 96 | 1 | 0 |
| — | 1 | 96 | 1 | 38 |
| — | 1 | 96 | 1 | 76 |
| — | 1 | 96 | 2 | 0 |
| — | 1 | 96 | 2 | 38 |
| — | 1 | 96 | 2 | 76 |

The present disclosure also focuses on the design of CORESET #0 configuration for RMSI reception from neighboring cell on a higher frequency range. The present disclosure includes the following aspects: (1) configuring CORESET #0 in RRC parameter, (2) configuring CORESET #0 in PBCH payload, wherein: (i) approach 1: scaling the offset from 120 kHz SCS; (b) approach 2: Flexibility in the combination of multiplexing pattern, number of symbols for CORESET #0, and CORESET #0 BW; and (c) approach 3: Flexibility in the RB offset; (3) fixed CORESET #0 parameter; and (4) mixed method.

In NR Rel-15 and Rel-16, both 120 kHz and 240 kHz subcarrier spacing (SCS) can be utilized as the SCS of SS/PBCH block, for both standalone and non-standalone operations. For SCell and PSCell, the information related to SS/PBCH block can be provided by RRC parameter, including physical cell ID, frequency location, subcarrier spacing, periodicity, transmission pattern, and power of the SS/PBCH block. Moreover, configuration on initial BWP can also be provided in the RRC parameter.

In addition, for some use cases, e.g., CGI purpose, some cell reselection procedures, and some handover procedures, a UE can be configured to acquire the SIB1 from a neighboring cell, wherein the physical cell ID and frequency location of the SS/PBCH block in the neighboring cell is provided to the UE. For higher frequency range, e.g., 52.6 GHz to 71 GHz, new subcarrier spacings such as 480 kHz and/or 960 kHz can be supported, and enhancement to RMSI reception from a neighboring cell can be enhanced accordingly. the present disclosure focuses on the case where the new subcarrier spacings are not applicable for SS/PBCH blocks in initial cell search.

In one embodiment, when a UE is required to receive RMSI from a neighboring cell (e.g., configured to report CGI), the UE can be configured with parameters about CORESET #0 (e.g., associated with the RRC configuration for reporting CGI). The content of the parameters about CORESET #0 can include at least one of the following examples.

For one example, the parameters about CORESET #0 can include a number of symbols for CORESET #0.

For another example, the parameters about CORESET #0 can include a multiplexing pattern between CORESET #0 and the associated SS/PBCH block.

For yet another example, the parameters about CORESET #0 can include a bandwidth of CORESET #0 in term of RBs.

For yet another example, the parameters about CORESET #0 can include a frequency offset in term of RBs, from the first RB of CORESET #0 to the first RB of SS/PBCH block.

For yet another example, the parameters about CORESET #0 can include a frequency offset in term of REs, from the closest first RE in an RB of CORESET #0 to the first RE of SS/PBCH block (e.g., $k_{SSB}$).

For yet another example, the parameters about CORESET #0 can include a subcarrier spacing of CORESET #0.

In one further aspect of this embodiment, the UE can be further configured with information about cell access, wherein the information includes at least one of whether the cell is barred or not, or whether intra frequency reselection is allowed or not.

Figure 7:
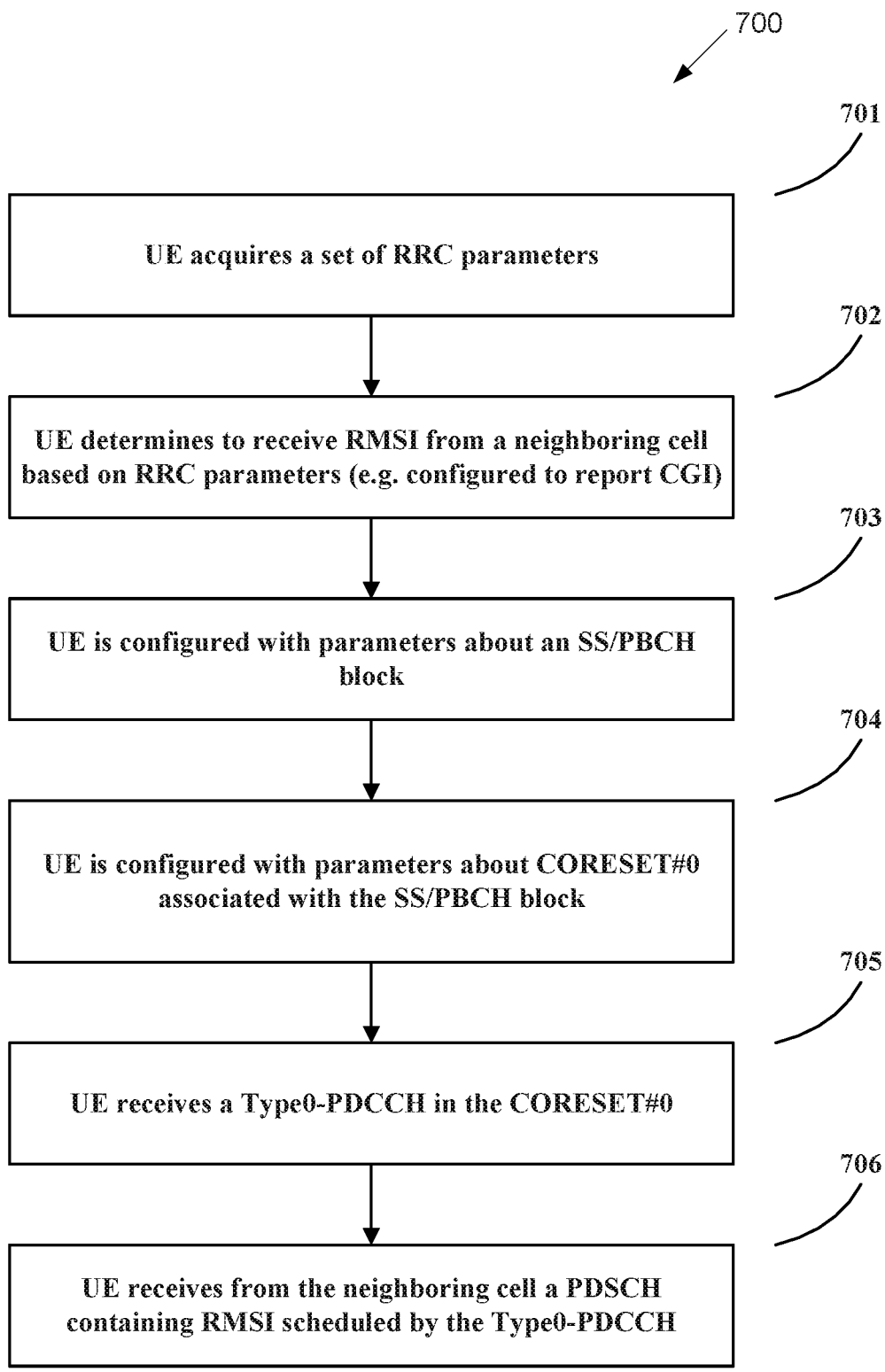
FIG. 7 illustrates a flowchart of a method of UE for receiving RMSI for CGI purpose according to embodiments of the present disclosure.

FIG. 7 illustrates a flowchart of a method 700 of UE for receiving RMSI for CGI purpose according to embodiments of the present disclosure. The method 700 as may be performed by a UE (e.g., 111-116 as illustrated in FIG. 1). An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

An example UE procedure for receiving RMSI from a neighboring cell (e.g., for CGI purpose) wherein CORESET #0 configuration is provided by RRC parameter is shown in FIG. 7.

As illustrated in FIG. 7, in step 701, a UE acquires a set of RRC parameters and determines to receive RMSI from a neighboring cell (e.g., be configured to report CGI) based on the set of RRC parameters in step 702. The UE further determines configuration on the parameters about an SS/PBCH block (e.g., the frequency information of the SS/PBCH block and/or the SCS of the SS/PBCH block), from the set of RRC parameters in step 703, and further determines configuration on parameters about a CORESET #0 associated with the SS/PBCH block from the set of RRC parameters in step 704, wherein the parameters about a CORESET #0 can be according to the embodiment in this disclosure. The UE receives from the neighboring cell a Type0-PDCCH in the CORESET #0 based on the configuration of CORESET #0 in step 705 and further receives PDSCH containing RMSI scheduled by the Type0-PDCCH in step 706.

In one embodiment, when a UE is required to receive RMSI from a neighboring cell (e.g., configured to report CGI), the UE can be configured with parameters about an SS/PBCH block from a neighboring cell, and the UE can acquire parameters about CORESET #0 from the payload (e.g., MIB) of PBCH in the SS/PBCH block. The content of the parameters about CORESET #0 can include at least one of the following examples.

For one example, the parameters about CORESET #0 can include a number of symbols for CORESET #0.

For another example, the parameters about CORESET #0 can include a multiplexing pattern between CORESET #0 and the associated SS/PBCH block.

For yet another example, the parameters about CORESET #0 can include a bandwidth of CORESET #0 in term of RBs.

For yet another example, the parameters about CORESET #0 can include a frequency offset in term of RBs, from the first RB of CORESET #0 to the first RB of SS/PBCH block.

For yet another example, the parameters about CORESET #0 can include a frequency offset in term of REs, from the closest first RE in an RB of CORESET #0 to the first RE of SS/PBCH block (e.g., $k_{SSB}$).

For yet another example, the parameters about CORESET #0 can include a subcarrier spacing of CORESET #0.

In one further aspect of this embodiment, the UE can be further configured with information about cell access from the payload (e.g., MIB) of PBCH in the SS/PBCH block, wherein the information includes at least one of whether the cell is barred or not, or whether intra frequency reselection is allowed or not.

Figure 8:
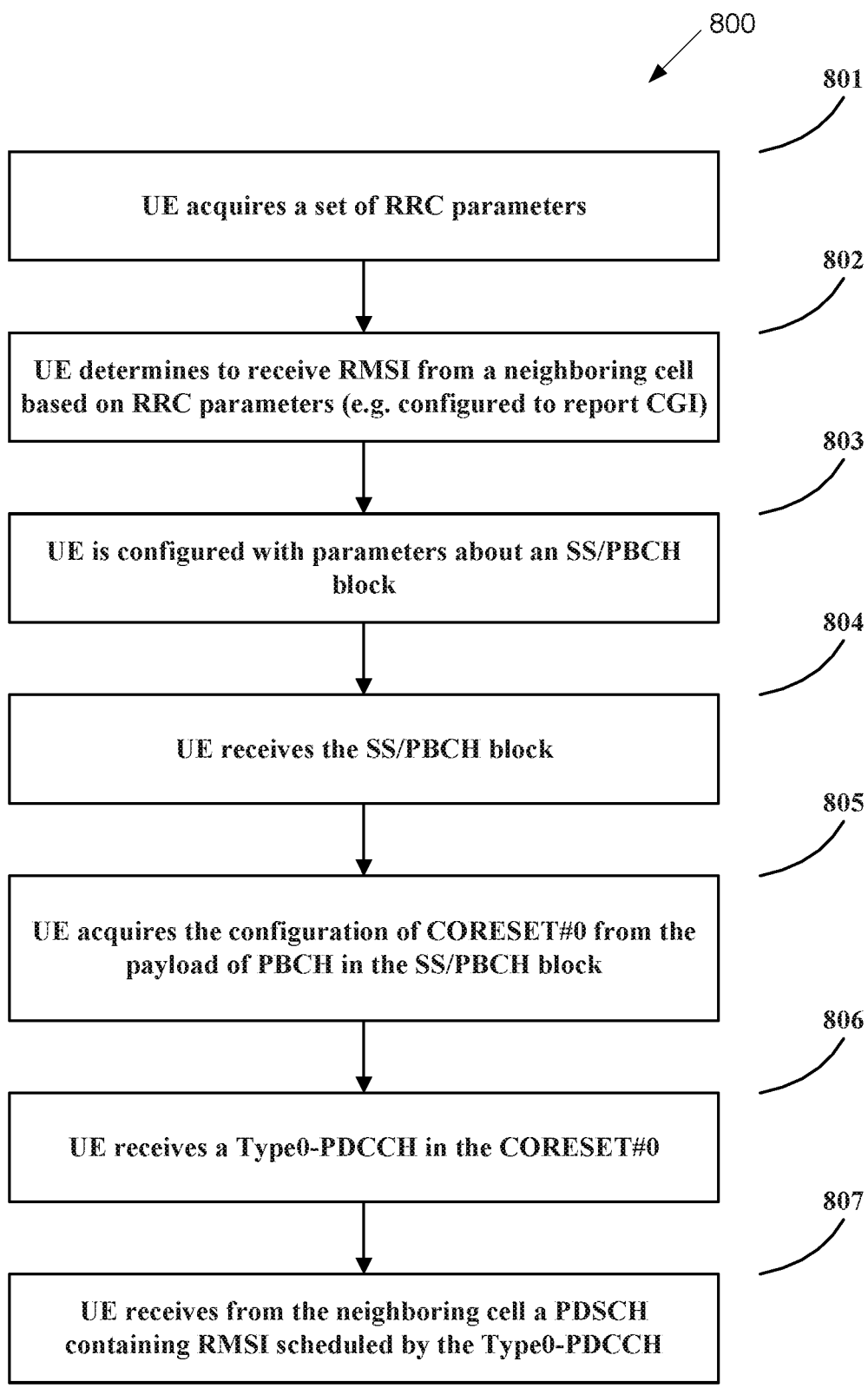
FIG. 8 illustrates a flowchart of a method of a UE for receiving RMSI for CGI purpose according to embodiments of the present disclosure.

FIG. 8 illustrates a flowchart of a method 800 of a UE for receiving RMSI for CGI purpose according to embodiments of the present disclosure. The method 800 as may be performed by a UE (e.g., 111-116 as illustrated in FIG. 1). An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

An example UE procedure for receiving RMSI from a neighboring cell (e.g., for CGI purpose) wherein CORESET #0 configuration is provided by the payload of PBCH in an SS/PBCH block of neighboring cell is shown in FIG. 8. A UE acquires a set of RRC parameters in step 801 and determines to receive RMSI from a neighboring cell (e.g., be configured to report CGI) based on the set of RRC parameters in step 802. The UE further determines configuration on the parameters about an SS/PBCH block (e.g., the frequency information of the SS/PBCH block and/or the SCS of the SS/PBCH block), from the set of RRC parameters in step 803 and further receives the SS/PBCH block in step 804. The UE acquires configuration on parameters about a CORESET #0 associated with the SS/PBCH block from the payload of PBCH in the received SS/PBCH block in step 805. The UE receives from the neighboring cell a Type0-PDCCH in the CORESET #0 based on the configuration of CORESET #0 in step 806, and further receives PDSCH containing RMSI scheduled by the Type0-PDCCH in step 807.

In one embodiment, FIG. 6 illustrates an example of frequency offset from CORESET #0 to SS/PBCH block in multiplexing Pattern 1 600 according to embodiments of the present disclosure. An embodiment of the frequency offset from CORESET #0 to SS/PBCH block in multiplexing Pattern 1 600 shown in FIG. 6 is for illustration only.

In one example, for CORESET #0 and SS/PBCH block multiplexing pattern 1, the configuration for the frequency RB offset from CORESET #0 to SS/PBCH block can be selected as one or more from the following cases in FIG. 6. In a first case, the CORESET #0 and SS/PBCH block are bottom aligned, such that the frequency RB offset is given by 0; in a second case, the CORESET #0 and SS/PBCH block are top aligned, such that the frequency RB offset is given by $N_{RB}^{CORESET \#0} - N_{RB}^{SSB}$; in a third case, the CORESET #0 and SS/PBCH block are center aligned, such that the frequency RB offset is given by $(N_{RB}^{CORESET \#0} - N_{RB}^{SSB})/2$; wherein $N_{RB}^{CORESET \#0}$ is the number of RB for CORESET #0 bandwidth with respect to the SCS of CORESET #0, and $N_{RB}^{SSB}$ is the number of RB for SS/PBCH block bandwidth with respect to the SCS of CORESET #0.

In one example, for multiplexing pattern 1, the supported cases for 480 kHz and/or 960 kHz can correspond to the same cases supported for 120 kHz SCS, wherein the number of RB as the frequency offset is the same as 120 kHz SCS.

For one example, when SCS of SS/PBCH block and SCS of Type0-PDCCH in CORESET #0 are both 480 kHz or 960 kHz, all or part of the following example configurations in Table 1 can be supported, wherein $N_{symbol}^{CORESET \#0}$ is the number of symbol for CORESET #0. In one further example, if the UE bandwidth for initial cell search is limit to 400 MHz, then only configurations with $N_{RB}^{CORESET \#0}=24$ or 48 RB are applicable for 480 kHz SCS, and only configurations with $N_{RB}^{CORESET \#0}=24$ are applicable for 960 kHz SCS. In another further example, if the UE bandwidth for initial cell search is limit to 200 MHz, then only configurations with $N_{RB}^{CORESET \#0}=24$ RB are applicable for 480 kHz SCS.

TABLE 18

Example enhancement to CORESET#0 configuration when {SS/PBCH block, PDCCH} SCS is {480, 480} or {960, 960} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| — | 1 | 24 | 2 | 0 |
| — | 1 | 24 | 2 | 4 |
| — | 1 | 48 | 1 | 14 |
| — | 1 | 48 | 2 | 14 |
| — | 1 | 96 | 1 | 38 |
| — | 1 | 96 | 2 | 38 |
| — | 3 | 24 | 2 | −20 if $k_{SSB}=0$ −21 if $k_{SSB}>0$ |
| — | 3 | 24 | 2 | 24 |
| — | 3 | 48 | 2 | −20 if $k_{SSB}=0$ −21 if $k_{SSB}>0$ |
| — | 3 | 48 | 2 | 48 |
| — | 3 | 96 | 2 | −20 if $k_{SSB}=0$ −21 if $k_{SSB}>0$ |
| — | 3 | 96 | 2 | 96 |
| — | 2 | 24 | 2 | −20 if $k_{SSB}=0$ −21 if $k_{SSB}>0$ |

TABLE 18-continued

Example enhancement to CORESET#0 configuration when {SS/PBCH block, PDCCH} SCS is {480, 480} or {960, 960} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| — | 2 | 24 | 2 | 24 |
| — | 2 | 48 | 2 | −20 if $k_{SSB}=0$ −21 if $k_{SSB}>0$ |
| — | 2 | 48 | 2 | 48 |
| — | 2 | 96 | 2 | −20 if $k_{SSB}=0$ −21 if $k_{SSB}>0$ |
| — | 2 | 96 | 2 | 96 |

For another example, when SCS of SS/PBCH block as 480 kHz and SCS of Type0-PDCCH in CORESET #0 are both 480 kHz or 960 kHz, all or part of the following example configurations in TABLE 19 can be supported, wherein $N_{symbol}^{CORESET \#0}$ the number of symbol for CORESET #0. In one further example, if the UE bandwidth for initial cell search is limit to 400 MHz, then only configurations with $N_{RB}^{CORESET \#0}=24$ or 48 RB are applicable for 480 kHz SCS, and only configurations with $N_{RB}^{CORESET \#0}=24$ are applicable for 960 kHz SCS. In another further example, if the UE bandwidth for initial cell search is limit to 200 MHz, then only configurations with $N_{RB}^{CORESET \#0}=24$ RB are applicable for 480 kHz SCS.

TABLE 19

Example enhancement to CORESET#0 configuration when {SS/PBCH block, PDCCH} SCS is {480, 480} kHz or {960, 960} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| — | 1 | 24 | 2 | 0 |
| — | 1 | 24 | 2 | 4 |
| — | 1 | 48 | 1 | 0 |
| — | 1 | 48 | 1 | 28 |
| — | 1 | 48 | 2 | 0 |
| — | 1 | 48 | 2 | 28 |
| — | 1 | 96 | 1 | 38 |
| — | 1 | 96 | 2 | 38 |
| — | 3 | 24 | 2 | −20 if $k_{SSB}=0$ −21 if $k_{SSB}>0$ |
| — | 3 | 24 | 2 | 24 |
| — | 3 | 48 | 2 | −20 if $k_{SSB}=0$ −21 if $k_{SSB}>0$ |
| — | 3 | 48 | 2 | 48 |
| — | 3 | 96 | 2 | −20 if $k_{SSB}=0$ −21 if $k_{SSB}>0$ |
| — | 3 | 96 | 2 | 96 |
| — | 2 | 24 | 2 | −20 if $k_{SSB}=0$ −21 if $k_{SSB}>0$ |
| — | 2 | 24 | 2 | 24 |
| — | 2 | 48 | 2 | −20 if $k_{SSB}=0$ −21 if $k_{SSB}>0$ |
| — | 2 | 48 | 2 | 48 |
| — | 2 | 96 | 2 | −20 if $k_{SSB}=0$ −21 if $k_{SSB}>0$ |
| — | 2 | 96 | 2 | 96 |

In another example, for multiplexing pattern 1, the number of supported cases for 480 kHz and/or 960 kHz can be minimized to one, for a given combination of a multiplexing pattern, CORESET #bandwidth, and number of symbols for CORESET #0. For this example, the number of the supported combinations of a multiplexing pattern, CORESET #bandwidth, and number of symbols for CORESET #0 can be with better flexibility. Moreover, the supported one case can be either case from FIG. 6.

For one example, when SCS of SS/PBCH block and SCS of Type0-PDCCH in CORESET #0 are both 480 kHz or 960 kHz, all or part of the following example configurations in TABLE 20, TABLE 21, or TABLE 22 can be supported, wherein $N_{symbol}^{CORESET\ \#0}$ is the number of symbol for CORESET #0. In one further example, if the UE bandwidth for initial cell search is limit to 400 MHz, then only configurations with $N_{RB}^{CORESET\ \#0}$=24 or 48 RB are applicable for 480 kHz SCS, and only configurations with $N_{RB}^{CORESET\ \#0}$=24 are applicable for 960 kHz SCS. In another further example, if the UE bandwidth for initial cell search is limit to 200 MHz, then only configurations with $N_{RB}^{CORESET\ \#0}$=24 RB are applicable for 480 kHz SCS.

TABLE 20

Example enhancement to CORESET#0 configuration when {SS/PBCH block, PDCCH} SCS is {480, 480} or {960, 960} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| — | 1 | 24 | 2 | 0 |
| — | 1 | 48 | 1 | 0 |
| — | 1 | 48 | 2 | 0 |
| — | 1 | 96 | 1 | 0 |
| — | 1 | 96 | 2 | 0 |
| — | 3 | 24 | 2 | −20 if $k_{SSB}$ = 0; −21 if $k_{SSB}$ > 0 |
| — | 3 | 24 | 2 | 24 |
| — | 3 | 48 | 2 | −20 if $k_{SSB}$ = 0; −21 if $k_{SSB}$ > 0 |
| — | 3 | 48 | 2 | 48 |
| — | 3 | 96 | 2 | −20 if $k_{SSB}$ = 0; −21 if $k_{SSB}$ > 0 |
| — | 3 | 96 | 2 | 96 |
| — | 2 | 24 | 2 | −20 if $k_{SSB}$ = 0; −21 if $k_{SSB}$ > 0 |
| — | 2 | 24 | 2 | 24 |
| — | 2 | 48 | 2 | −20 if $k_{SSB}$ = 0; −21 if $k_{SSB}$ > 0 |
| — | 2 | 48 | 2 | 48 |
| — | 2 | 96 | 2 | −20 if $k_{SSB}$ = 0; −21 if $k_{SSB}$ > 0 |
| — | 2 | 96 | 2 | 96 |

TABLE 21

Example enhancement to CORESET#0 configuration when {SS/PBCH block, PDCCH} SCS is {480, 480} or {960, 960} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| — | 1 | 24 | 2 | 4 |
| — | 1 | 48 | 1 | 28 |
| — | 1 | 48 | 2 | 28 |
| — | 1 | 96 | 1 | 76 |
| — | 1 | 96 | 2 | 76 |
| — | 3 | 24 | 2 | −20 if $k_{SSB}$ = 0; −21 if $k_{SSB}$ > 0 |
| — | 3 | 24 | 2 | 24 |
| — | 3 | 48 | 2 | −20 if $k_{SSB}$ = 0; −21 if $k_{SSB}$ > 0 |
| — | 3 | 48 | 2 | 48 |
| — | 3 | 96 | 2 | −20 if $k_{SSB}$ = 0; −21 if $k_{SSB}$ > 0 |
| — | 3 | 96 | 2 | 96 |
| — | 2 | 24 | 2 | −20 if $k_{SSB}$ = 0; −21 if $k_{SSB}$ > 0 |
| — | 2 | 24 | 2 | 24 |
| — | 2 | 48 | 2 | −20 if $k_{SSB}$ = 0; −21 if $k_{SSB}$ > 0 |
| — | 2 | 48 | 2 | 48 |
| — | 2 | 96 | 2 | −20 if $k_{SSB}$ = 0; −21 if $k_{SSB}$ > 0 |
| — | 2 | 96 | 2 | 96 |

TABLE 22

Example enhancement to CORESET#0 configuration when {SS/PBCH block, PDCCH} SCS is {480, 480} or {960, 960} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| — | 1 | 24 | 2 | 2 |
| — | 1 | 48 | 1 | 14 |
| — | 1 | 48 | 2 | 14 |
| — | 1 | 96 | 1 | 38 |
| — | 1 | 96 | 2 | 38 |
| — | 3 | 24 | 2 | −20 if $k_{SSB}$ = 0; −21 if $k_{SSB}$ > 0 |
| — | 3 | 24 | 2 | 24 |
| — | 3 | 48 | 2 | −20 if $k_{SSB}$ = 0; −21 if $k_{SSB}$ > 0 |
| — | 3 | 48 | 2 | 48 |
| — | 3 | 96 | 2 | −20 if $k_{SSB}$ = 0; −21 if $k_{SSB}$ > 0 |
| — | 3 | 96 | 2 | 96 |
| — | 2 | 24 | 2 | −20 if $k_{SSB}$ = 0; −21 if $k_{SSB}$ > 0 |
| — | 2 | 24 | 2 | 24 |
| — | 2 | 48 | 2 | −20 if $k_{SSB}$ = 0; −21 if $k_{SSB}$ > 0 |
| — | 2 | 48 | 2 | 48 |
| — | 2 | 96 | 2 | −20 if $k_{SSB}$ = 0; −21 if $k_{SSB}$ > 0 |
| — | 2 | 96 | 2 | 96 |

In yet another example, for multiplexing pattern 1, the number of supported cases for 480 kHz and/or 960 kHz can be more than one, for a given combination of a multiplexing pattern, CORESET #bandwidth, and number of symbols for CORESET #0. For this example, for a given combination of a multiplexing pattern, CORESET #bandwidth, and number of symbols for CORESET #0, the frequency offset can be with better flexibility. Moreover, if the number of supported cases is two, the supported two cases can be Case A and Case B from FIG. 6; if the number of supported cases is three, the supported two cases can be Case A, Case B, and Case C from FIG. 6.

For one example, when SCS of SS/PBCH block and SCS of Type0-PDCCH in CORESET #0 are both 480 kHz or 960 kHz, all or part of the following example configurations in TABLE 23 or TABLE 24 can be supported, wherein $N_{symbol}^{CORESET\ \#0}$ is the number of symbol for CORESET #0. In one further example, if the UE bandwidth for initial cell search is limit to 400 MHz, then only configurations with $N_{RB}^{CORESET\ \#0}$=24 or 48 RB are applicable for 480 kHz SCS, and only configurations with $N_{RB}^{CORESET\ \#0}$=24 are applicable for 960 kHz SCS. In another further example, if the UE bandwidth for initial cell search is limit to 200 MHz, then only configurations with $N_{RB}^{CORESET\ \#0}=24$ RB are applicable for 480 kHz SCS.

TABLE 23

Example enhancement to CORESET#0 configuration when {SS/PBCH block, PDCCH} SCS is {480, 480} or {960, 960} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| — | 1 | 24 | 2 | 0 |
| — | 1 | 24 | 2 | 4 |
| — | 1 | 48 | 1 | 0 |
| — | 1 | 48 | 1 | 28 |
| — | 1 | 48 | 2 | 0 |
| — | 1 | 48 | 2 | 28 |
| — | 1 | 96 | 1 | 0 |
| — | 1 | 96 | 1 | 76 |
| — | 1 | 96 | 2 | 0 |
| — | 1 | 96 | 2 | 76 |
| — | 3 | 24 | 2 | −20 if $k_{SSB}=0$ −21 if $k_{SSB}>0$ |
| — | 3 | 24 | 2 | 24 |
| — | 3 | 48 | 2 | −20 if $k_{SSB}=0$ −21 if $k_{SSB}>0$ |
| — | 3 | 48 | 2 | 48 |
| — | 3 | 96 | 2 | −20 if $k_{SSB}=0$ −21 if $k_{SSB}>0$ |
| — | 3 | 96 | 2 | 96 |
| — | 2 | 24 | 2 | −20 if $k_{SSB}=0$ −21 if $k_{SSB}>0$ |
| — | 2 | 24 | 2 | 24 |
| — | 2 | 48 | 2 | −20 if $k_{SSB}=0$ −21 if $k_{SSB}>0$ |
| — | 2 | 48 | 2 | 48 |
| — | 2 | 96 | 2 | −20 if $k_{SSB}=0$ −21 if $k_{SSB}>0$ |
| — | 2 | 96 | 2 | 96 |

TABLE 24

Example enhancement to CORESET#0 configuration when {SS/PBCH block, PDCCH} SCS is {480, 480} or {960, 960} kHz.

| Index | SSB and CORESET#0 multiplexing pattern | $N_{RB}^{CORESET\#0}$ | $N_{symbol}^{CORESET\#0}$ | Offset (RB) |
|---|---|---|---|---|
| — | 1 | 24 | 2 | 0 |
| — | 1 | 24 | 2 | 2 |
| — | 1 | 24 | 2 | 4 |
| — | 1 | 48 | 1 | 0 |
| — | 1 | 48 | 1 | 14 |
| — | 1 | 48 | 1 | 28 |
| — | 1 | 48 | 2 | 0 |
| — | 1 | 48 | 2 | 14 |
| — | 1 | 48 | 2 | 28 |
| — | 1 | 96 | 1 | 0 |
| — | 1 | 96 | 1 | 38 |
| — | 1 | 96 | 1 | 76 |
| — | 1 | 96 | 2 | 0 |
| — | 1 | 96 | 2 | 38 |
| — | 1 | 96 | 2 | 76 |
| — | 3 | 24 | 2 | −20 if $k_{SSB}=0$ −21 if $k_{SSB}>0$ |
| — | 3 | 24 | 2 | 24 |
| — | 3 | 48 | 2 | −20 if $k_{SSB}=0$ −21 if $k_{SSB}>0$ |
| — | 3 | 48 | 2 | 48 |
| — | 3 | 96 | 2 | −20 if $k_{SSB}=0$ −21 if $k_{SSB}>0$ |
| — | 3 | 96 | 2 | 96 |
| — | 2 | 24 | 2 | −20 if $k_{SSB}=0$ −21 if $k_{SSB}>0$ |
| — | 2 | 24 | 2 | 24 |
| — | 2 | 48 | 2 | −20 if $k_{SSB}=0$ −21 if $k_{SSB}>0$ |
| — | 2 | 48 | 2 | 48 |
| — | 2 | 96 | 2 | −20 if $k_{SSB}=0$ −21 if $k_{SSB}>0$ |
| — | 2 | 96 | 2 | 96 |

In one embodiment, when a UE is required to receive RMSI from a neighboring cell (e.g., configured to report CGI), the UE can be configured with parameters about an SS/PBCH block from a neighboring cell, and the UE can determine at least some of the parameters about CORESET #0 without explicit indication (i.e., the at least some of the parameters about CORESET #0 is fixed). The content of the parameters about CORESET #0 can include at least one of the following examples.

For one example, the parameters about CORESET #0 can include a number of symbols for CORESET #0. For one sub-example, the number of symbols for CORESET #0 can be fixed as 2.

For another example, the parameters about CORESET #0 can include a multiplexing pattern between CORESET #0 and the associated SS/PBCH block. For one sub-example, the multiplexing pattern between CORESET #0 and the associated SS/PBCH block can be fixed as Pattern 1.

For yet another example, the parameters about CORESET #0 can include a bandwidth of CORESET #0 in term of RBs. For one sub-example, the bandwidth of CORESET #0 can be fixed as 48 RBs.

For yet another example, the parameters about CORESET #0 can include a frequency offset in term of RBs, from the first RB of CORESET #0 to the first RB of SS/PBCH block. For one sub-example, the frequency offset in term of RBs can be fixed as 0 RB.

For yet another example, the parameters about CORESET #0 can include a frequency offset in term of REs, from the closest first RE in an RB of CORESET #0 to the first RE of SS/PBCH block (e.g., $k_{SSB}$). For one sub-example, the frequency offset in term of REs can be fixed as 0 RE (e.g., $k_{SSB}=0$).

For yet another example, the parameters about CORESET #0 can include a subcarrier spacing of CORESET #0. For one sub-example, the subcarrier spacing of CORESET #0 is fixed as same as the subcarrier spacing of the associated SS/PBCH block. For another sub-example, the subcarrier spacing of CORESET #0 can be determined by the subcarrier spacing of the associated SS/PBCH block, e.g., if the subcarrier spacing of the associated SS/PBCH block is 120 kHz or 240 kHz, the subcarrier spacing of CORESET #0 is 120 kHz; if the subcarrier spacing of the associated SS/PBCH block is 480 kHz, the subcarrier spacing of CORESET #0 is 480 kHz; if the subcarrier spacing of the associated SS/PBCH block is 960 kHz, the subcarrier spacing of CORESET #0 is 960 kHz.

In one embodiment, when a UE is required to receive RMSI from a neighboring cell (e.g., configured to report CGI), the UE can be configured with parameters about an SS/PBCH block from a neighboring cell, and the UE can determine the parameters about CORESET #0 based on a mixed example of at least two examples from explicit configuration by RRC parameter, explicit configuration by PBCH payload, and non-explicit configuration (fixed parameter), wherein the content of the parameters about CORESET #0 can include the following examples.

For one example, the parameters about CORESET #0 can include a number of symbols for CORESET #0.

For another example, the parameters about CORESET #0 can include a multiplexing pattern between CORESET #0 and the associated SS/PBCH block.

For yet another example, the parameters about CORESET #0 can include a bandwidth of CORESET #0 in term of RBs.

For yet another example, the parameters about CORESET #0 can include a frequency offset in term of RBs, from the first RB of CORESET #0 to the first RB of SS/PBCH block.

For yet another example, the parameters about CORESET #0 can include a frequency offset in term of REs, from the closest first RE in an RB of CORESET #0 to the first RE of SS/PBCH block (e.g., $k_{SSB}$).

For yet another example, the parameters about CORESET #0 can include a subcarrier spacing of CORESET #0.

In one example of this embodiment, the parameter about CORESET #0 provided by PBCH payload can override the same parameter if configured by RRC or determined by the UE by default.

In another example of this embodiment, the parameter about CORESET #0 provided by the RRC parameter can override the same parameter if configured by PBCH payload or determined by the UE by default.

For illustrative purposes the steps of flowcharts herein are described serially, however, some of these steps may be performed in parallel to each other. The above operation diagrams illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
   a transceiver configured to receive, from a base station (BS), a synchronization signals and physical broadcast channel (SS/PBCH) block; and
   a processor operably coupled to the transceiver, the processor configured to identify parameters including:
      a subcarrier spacing (SCS) for a control resource set (CORESET) to receive a Type0 physical downlink control channel (Type0-PDCCH), that is the same as a SCS of the SS/PBCH block;
      a SS/PBCH block and CORESET multiplexing pattern;
      a number of resource blocks (RBs) associated with the CORESET ($N_{RB}^{CORESET}$);
      a number of symbols associated with the CORESET ($N_{symbol}^{CORESET}$); and
      an offset in a unit of RB;
   wherein the SCS of the CORESET is one of 120 kilohertz (kHz), 480 kHz, or 960 kHz,
   wherein, in case that the SS/PBCH block and CORESET multiplexing pattern is 1 (Pattern 1):
      when $N_{RB}^{CORESET}=24$, $N_{symbol}^{CORESET}$ is identified as 2;
      when $N_{RB}^{CORESET}=48$, $N_{symbol}^{CORESET}$ is identified as 1 or 2; and
      when $N_{RB}^{CORESET}=96$, $N_{symbol}^{CORESET}$ is identified as 1 or 2, and
   wherein the transceiver is further configured to receive, based on the parameters, the Type0-PDCCH over a downlink channel.

2. The UE of claim 1, wherein, in case that the SS/PBCH block and CORESET multiplexing pattern is 1 (Pattern 1), the offset is identified as one of:
   0 or 4, when $N_{RB}^{CORESET}=24$ and $N_{symbol}^{CORESET}=2$;
   0, 14, or 28, when $N_{RB}^{CORESET}=48$ and $N_{symbol}^{CORESET}=1$;
   0, 14, or 28, when $N_{RB}^{CORESET}=48$ and $N_{symbol}^{CORESET}=2$;
   0 or 76, when $N_{RB}^{CORESET}=96$ and $N_{symbol}^{CORESET}=1$; or
   0 or 76, when $N_{RB}^{CORESET}=96$ and $N_{symbol}^{CORESET}=2$.

3. The UE of claim 1, wherein, in case that the SS/PBCH block and CORESET multiplexing pattern is 3 (Pattern 3):
   when $N_{RB}^{CORESET}=24$, $N_{symbol}^{CORESET}$ is identified as 2; and
   when $N_{RB}^{CORESET}=48$, $N_{symbol}^{CORESET}$ is identified as 2.

4. The UE of claim 3, wherein, in case that the SS/PBCH block and CORESET multiplexing pattern is 3 (Pattern 3), the offset is identified as one of:
   −20 or 24, when $N_{RB}^{CORESET}=24$, $N_{symbol}^{CORESET}=2$, and $k_{SSB}=0$;
   −21 or 24, when $N_{RB}^{CORESET}=24$, $N_{symbol}^{CORESET}=2$, and $k_{SSB}>0$;
   −20 or 48, when $N_{RB}^{CORESET}=48$, $N_{symbol}^{CORESET}=2$, and $k_{SSB}=0$; or
   −21 or 48, when $N_{RB}^{CORESET}=48$, $N_{symbol}^{CORESET}=2$, and $k_{SSB}>0$; and
   wherein $k_{SSB}$ is a subcarrier offset from the SS/PBCH block to the CORESET.

5. A base station (BS) in a wireless communication system, the BS comprising:
   a transceiver configured to transmit, to a user equipment (UE), a synchronization signals and physical broadcast channel (SS/PBCH) block; and
   a processor operably coupled to the transceiver, the processor configured to identify parameters including:
      a subcarrier spacing (SCS) for a control resource set (CORESET) to transmit a Type0 physical downlink control channel (Type0-PDCCH), that is the same as a SCS of the SS/PBCH block;
      a SS/PBCH block and CORESET multiplexing pattern;
      a number of resource blocks (RBs) associated with the CORESET ($N_{RB}^{CORESET}$);
      a number of symbols associated with the CORESET ($N_{symbol}^{CORESET}$); and
      an offset in a unit of RB,
   wherein the SCS of the CORESET is one of 120 kilohertz (kHz), 480 kHz, or 960 kHz,
   wherein, in case that the SS/PBCH block and CORESET multiplexing pattern is 1 (Pattern 1):
      when $N_{RB}^{CORESET}=24$, $N_{symbol}^{CORESET}$ is identified as 2, when $N_{RB}^{CORESET}=48$, $N_{symbol}^{CORESET}$ is identified as 1 or 2, and when $N_{RB}^{CORESET}=96$, $N_{symbol}^{CORESET}$ is identified as 1 or 2, and wherein the transceiver is further configured to transmit, based on the parameters, the Type0-PDCCH over a downlink channel.

6. The BS of claim 5, wherein, in case that the SS/PBCH block and CORESET multiplexing pattern is 1 (Pattern 1), the offset is identified as one of:

0 or 4, when $N_{RB}^{CORESET}=24$ and $N_{symbol}^{CORESET}=2$;

0, 14, or 28, when $N_{RB}^{CORESET}=48$ and $N_{symbol}^{CORESET}=1$;

0, 14, or 28, when $N_{RB}^{CORESET}=48$ and $N_{symbol}^{CORESET}=2$;

0 or 76, when $N_{RB}^{CORESET}=96$ and $N_{symbol}^{CORESET}=1$; or 0 or 76, when $N_{RB}^{CORESET}=96$ and $N_{symbol}^{CORESET}=2$.

7. The BS of claim 5, wherein, in case that the SS/PBCH block and CORESET multiplexing pattern is 3 (Pattern 3):

when $N_{RB}^{CORESET}=24$, $N_{symbol}^{CORESET}$ is identified as 2; and when $N_{RB}^{CORESET}=48$, $N_{symbol}^{CORESET}$ is identified as 2.

8. The BS of claim 7, wherein, in case that the SS/PBCH block and CORESET multiplexing pattern is 3 (Pattern 3), the offset is identified as one of:

−20 or 24, when $N_{RB}^{CORESET}=24$, $N_{symbol}^{CORESET}=2$, and $k_{SSB}=0$;

−21 or 24, when $N_{RB}^{CORESET}=24$, $N_{symbol}^{CORESET}=2$, and $k_{SSB}>0$;

−20 or 48, when $N_{RB}^{CORESET}=48$, $N_{symbol}^{CORESET}=2$, and $k_{SSB}=0$; or −21 or 48, when $N_{RB}^{CORESET}=48$, $N_{symbol}^{CORESET}=2$, and $k_{SSB}>0$; and wherein $k_{SSB}$ is a subcarrier offset from the SS/PBCH block to the CORESET.

9. A method for operating a user equipment (UE) in a wireless communication system, the method comprising:

receiving, from a base station (BS), a synchronization signals and physical broadcast channel (SS/PBCH) block;

identifying parameters including:
- a subcarrier spacing (SCS) for a control resource set (CORESET) to receive a Type0 physical downlink control channel (Type0-PDCCH), that is the same as a SCS of the SS/PBCH block;
- a SS/PBCH block and CORESET multiplexing pattern;
- a number of resource blocks (RBs) associated with the CORESET ($N_{RB}^{CORESET}$);
- a number of symbols associated with the CORESET ($N_{symbol}^{CORESET}$); and
- an offset in a unit of RB; and receiving, based on the parameters, the Type0-PDCCH over a downlink channel, wherein the SCS of the CORESET is one of 120 kilohertz (kHz), 480 kHz, or 960 kHz, and wherein, in case that the SS/PBCH block and CORESET multiplexing pattern is 1 (Pattern 1):

when $N_{RB}^{CORESET}=24$, $N_{symbol}^{CORESET}$ is identified as 2, when $N_{RB}^{CORESET}=48$, $N_{symbol}^{CORESET}$ is identified as 1 or 2, and when $N_{RB}^{CORESET}=96$, $N_{symbol}^{CORESET}$ is identified as 1 or 2.

10. The method of claim 9, wherein, in case that the SS/PBCH block and CORESET multiplexing pattern is 1 (Pattern 1), the offset is identified as one of:

0 or 4, when $N_{RB}^{CORESET}=24$ and $N_{symbol}^{CORESET}=2$;

0, 14, or 28, when $N_{RB}^{CORESET}=48$ and $N_{symbol}^{CORESET}=1$;

0, 14, or 28, when $N_{RB}^{CORESET}=48$ and $N_{symbol}^{CORESET}=2$;

0 or 76, when $N_{RB}^{CORESET}=96$ and $N_{symbol}^{CORESET}=1$; or 0 or 76, when $N_{RB}^{CORESET}=96$ and $N_{symbol}^{CORESET}=2$.

11. The method of claim 9, wherein, in case that the SS/PBCH block and CORESET multiplexing pattern is 3 (Pattern 3):

when $N_{RB}^{CORESET}=24$, $N_{symbol}^{CORESET}$ is identified as 2; and when $N_{RB}^{CORESET}=48$, $N_{symbol}^{CORESET}$ is identified as 2.

12. The method of claim 11, wherein, in case that the SS/PBCH block and CORESET multiplexing pattern is 3 (Pattern 3), the offset is identified as one of:

−20 or 24, when $N_{RB}^{CORESET}=24$, $N_{symbol}^{CORESET}=2$, and $k_{SSB}=0$;

−21 or 24, when $N_{RB}^{CORESET}=24$, $N_{symbol}^{CORESET}=2$, and $k_{SSB}>0$;

−20 or 48, when $N_{RB}^{CORESET}=48$, $N_{symbol}^{CORESET}=2$, and $k_{SSB}=0$; or −21 or 48, when $N_{RB}^{CORESET}=48$, $N_{symbol}^{CORESET}=2$, and $k_{SSB}>0$; and wherein $k_{SSB}$ is a subcarrier offset from the SS/PBCH block to the CORESET.

\* \* \* \* \*